«12» United States Patent
Potter, Jr. et al.

(10) Patent No.: US 7,085,229 B1
(45) Date of Patent: Aug. 1, 2006

(54) SCHEDULING ASSIST FOR DATA NETWORKING PACKET DEQUEUING IN A PARALLEL 1-D SYSTOLIC ARRAY SYSTEM

(75) Inventors: Kenneth H. Potter, Jr., Raleigh, NC (US); Michael L. Wright, Raleigh, NC (US); Hong-Man Wu, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 10/032,844

(22) Filed: Oct. 24, 2001

(51) Int. Cl.
*G01R 31/08* (2006.01)
*H04J 1/16* (2006.01)
*H04L 1/00* (2006.01)
*H04L 12/26* (2006.01)

(52) U.S. Cl. ...................... 370/231; 370/232; 370/412; 370/428; 709/5; 709/6; 709/52; 709/54; 719/314

(58) Field of Classification Search .................... None
See application file for complete search history.

(56) References Cited

U.S. PATENT DOCUMENTS

| 5,491,815 | A |  | 2/1996 | Basso et al. |  |
|---|---|---|---|---|---|
| 5,898,691 | A |  | 4/1999 | Liu |  |
| 6,011,805 | A |  | 1/2000 | Esteve et al. |  |
| 6,058,389 | A | * | 5/2000 | Chandra et al. | 707/1 |
| 6,122,514 | A | * | 9/2000 | Spaur et al. | 455/448 |
| 6,212,181 | B1 |  | 4/2001 | Divivier et al. |  |
| 6,226,266 | B1 |  | 5/2001 | Galand et al. |  |
| 6,256,323 | B1 |  | 7/2001 | Benayoun et al. |  |
| 6,275,696 | B1 | * | 8/2001 | Paik | 370/313 |

OTHER PUBLICATIONS

U.S. Appl. No. 09/791,062, Gary S. Muntz.
U.S. Appl. No. 09/791,063, Rachepalli et al.

* cited by examiner

*Primary Examiner*—Chi Pham
*Assistant Examiner*—Raj Jain
(74) *Attorney, Agent, or Firm*—Cesari and McKenna LLP

(57) ABSTRACT

The present invention comprises a scheduling assist function (scheduling assist) that enables a processor to schedule events and be notified when these events expire. In addition, the present invention includes features that enable a processor to associate these events with output channels and enable the processor to quickly locate output channels (links) that are available and ready to be serviced. The invention takes advantage of the fact that the scheduling assist can be dedicated exclusively to scanning tables in its own dedicated memories looking for events that have expired and/or output channels that are available and not involve the processor in the search for output channels that are available and ready to be serviced.

40 Claims, 16 Drawing Sheets

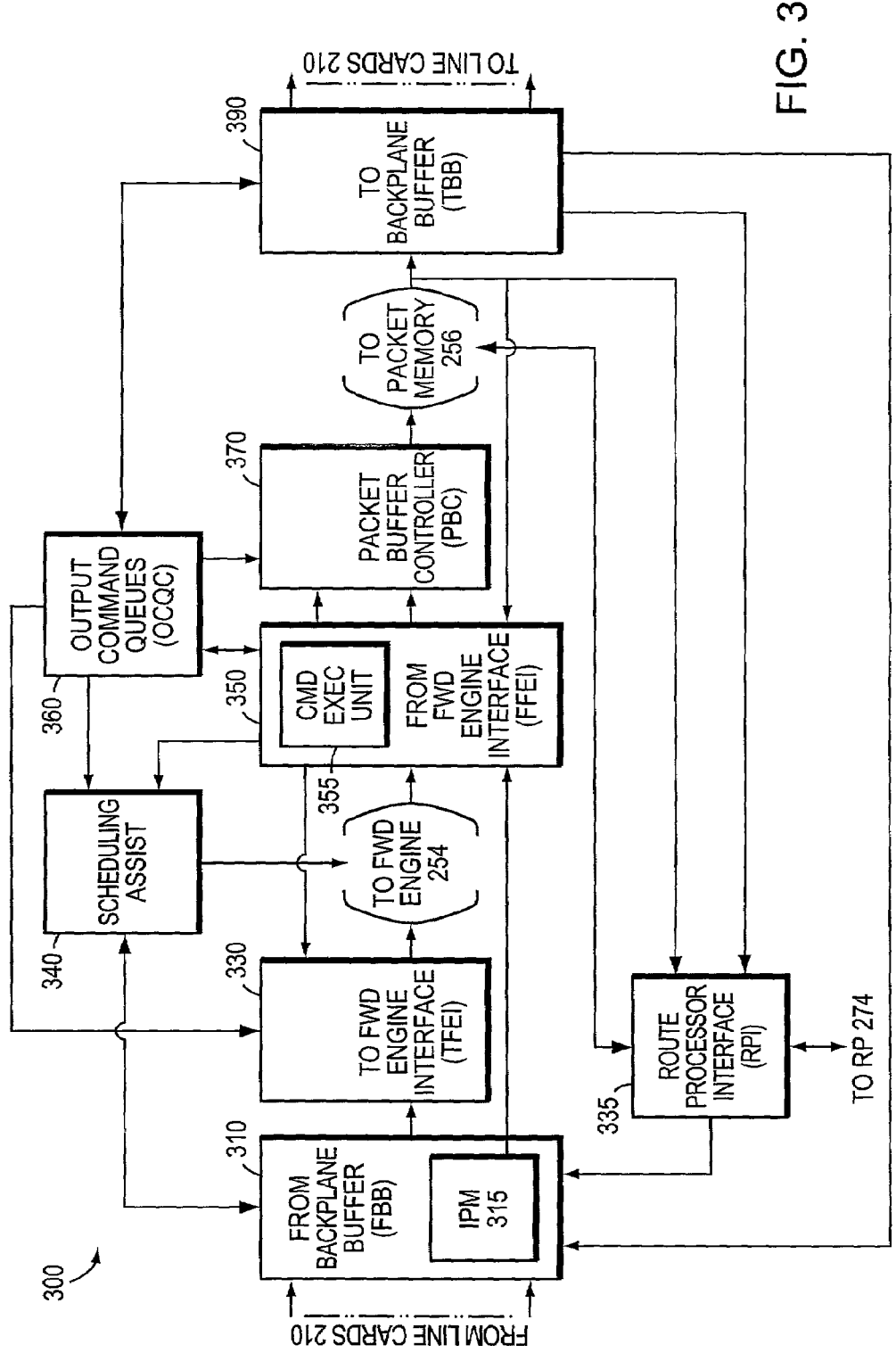

INVERTED RATE EXAMPLES

| | 150MHz | | | | 200MHz | | | |
|---|---|---|---|---|---|---|---|---|
| CHANNEL RATE | MULTIPLIER | SHIFT | COMPUTED RATE (CYCLES/BYTE) | ACCURACY FOR 65B PKL | MULTIPLIER | SHIFT | COMPUTED RATE (CYCLES/BYTE) | ACCURACY FOR 65B PKL |
| DS0 | 586 | 0 | 18752 | 0.01% | 781 | 0 | 24992 | 0.03% |
| 128K ISDN | 586 | 1 | 9376 | 0.01% | 781 | 1 | 12496 | 0.03% |
| FT1 (6 DS0) | 781 | 3 | 3124 | 0.03% | 521 | 2 | 4168 | 0.03% |
| T1 | 781 | 5 | 781 | 0.03% | 521 | 4 | 1042 | 0.03% |
| T3 | 853 | 10 | 26.8 | 0.09% | 572 | 9 | 35.7 | 0.08% |
| OC3 | 1022 | 12 | 7.969 | 0.16% | 681 | 11 | 10.6 | 0.11% |
| OC12 | 1022 | 14 | 1.984 | 0.55% | 681 | 13 | 2.64 | 0.55% |
| GE | 616 | 14 | 1.20 | 0.0% | 821 | 14 | 1.6 | 0.0% |
| OC48 | 513 | 15 | .4923 | 1.34% | 683 | 15 | .662 | 0.55% |

FIG. 5C

SCANNING TABLE

| CHANNEL RATE | # OF TIMES IN SCANNING TABLE | REPEAT RATE IN SCANNING TABLE | BYTES XMIT PER SCAN (150MHz) | BYTES XMIT PER SCAN (200MHz) |
|---|---|---|---|---|
| DS0 | 1 | 8192 | .8 | .6 |
| 128K ISDN | 1 | 8192 | 1.8 | 1.4 |
| FT1 (6 DS0) | 1 | 8192 | 5.2 | 4.0 |
| T1 | 4 | 2048 | 5.2 | 3.9 |
| T3 | 128 | 64 | 4.8 | 3.6 |
| OC3 | 256 | 32 | 8.0 | 6.0 |
| OC12 | 512 | 8 | 8.0 | 6.0 |
| GE | 2048 | 4 | 6.7 | 5.0 |
| OC48 | 4096 | 2 | 8.0 | 6.0 |

FIG. 6B

SCALING FACTOR EXAMPLES

| SYSTEM CLOCK RATE | 150MHz | | | 200MHz | | |
|---|---|---|---|---|---|---|
| CHANNEL RATE | SCALING FACTOR SHIFT (BITS) | MIN. BYTE GRANULARITY | MAX. BYTES | SCALING FACTOR SHIFT (BITS) | MIN. BYTE GRANULARITY | MAX. BYTES |
| DS0 | 14 | 1 | 49K | 14 | 1 | 37K |
| 128K ISDN | 14 | 2 | 98K | 14 | 2 | 73K |
| FT1 (6 DS0) | 12 | 1 | 73K | 12 | 1 | 55K |
| T1 | 10 | 2 | 73K | 10 | 1 | 55K |
| T3 | 6 | 2 | 134K | 6 | 2 | 100K |
| OC3 | 4 | 2 | 112K | 4 | 2 | 84K |
| OC12 | 2 | 2 | 112K | 2 | 2 | 84K |
| GE | 2 | 3 | 187K | 2 | 3 | 140K |
| OC48 | 0 | 2 | 112K | 0 | 2 | 84K |

FIG. 7B

SCHEDULING ASSIST FOR DATA NETWORKING PACKET DEQUEUING IN A PARALLEL 1-D SYSTOLIC ARRAY SYSTEM

FIELD OF THE INVENTION

The present invention relates to systolic arrays and, in particular, to a scheduling assist for a systolic array of a router used in a computer network.

BACKGROUND OF THE INVENTION

A class of data networking equipment, referred to as aggregation or edge routers, has emerged that aggregates thousands of physical or logical links from end users onto one or more higher speed "backbone" links (such as OC-12, Gigabit Ethernet, OC-48 and higher) of a computer network. As the name implies, these routers reside at the edge of the network and are "gatekeepers" for packets transmitted over the high-speed core of the network. As such, they are required to perform a list of advanced "high-touch" features on the packets to protect the network from unauthorized use and to deal with a wide range of unique link interfaces, protocols and encapsulation methods that the end user links require. In order to provide these complex features and to provide flexibility for newly defined features, these routers are normally implemented using specialized, programmable processors.

The sheer processing power and memory bandwidth required to access data structures (e.g., tables) in order to process packets dictates the use of multiple processors within an edge router. A common approach is to organize these processors into one or more parallel one-dimensional (1-D) systolic arrays wherein each array is assigned an incoming packet to process. Each processor within a single systolic array "pipeline" is assigned a piece of the task of processing the packet and therefore only needs access to a memory associated with that task. However, the corresponding processors in other parallel 1-D arrays that are performing the same tasks may also share that same memory. Furthermore, each processor has a limited amount of time to process its packet without impacting the flow of packets through the system and negatively impacting packet throughput.

One of the tasks performed by the processors is the task of "dequeuing." Dequeuing is the process of selecting a packet from an output queue that has a packet waiting to be sent and outputting that packet on a link. Output queues are typically associated with physical or logical links and more than one queue may be associated with a given link. That is, a link that supports different service priorities may have a separate queue assigned for each service priority that is supported on that link. Moreover, an edge router may include line cards configured to support interfaces and links of various data rates. For example, a line card may have a plurality of interfaces coupled to DS0 links while another line card may have its interfaces coupled to Gigabit Ethernet links. Notably, depending on the type of interface, a given link may have multiple channels associated therewith, e.g. channelized DS0. Thus, depending upon the configuration of the router, the task of dequeuing may involve searching among thousands of output links, to find one that is ready to output a packet (i.e., the link/channel is not exerting "back pressure"), and finding a corresponding output queue with a packet waiting to be sent. This task is further complicated by the fact that there can be wide variation in the speeds of the output links, e.g., from DS0 at 64K bits per second (bps) to OC-48 at 2.4 gigabits per second (Gbps).

In edge routers that employ systolic arrays, time and memory bandwidth are critical resources. A processor, in such an array, has a limited amount of time that it can spend finding a packet to be output (dequeued) on one of many thousands of possible links. Various software-based schemes have been employed to deal with this issue. Often these schemes use tables to track the queues. The size of these tables are often determined as a tradeoff between the amount of memory available to hold the tables and the number of processor cycles necessary to search the tables. However, despite taking into consideration this tradeoff, even the more efficient among these schemes is still not deterministic as to the time and number of memory accesses needed to perform a given search. In the case of a parallel systolic array, this non-deterministic behavior may result in the stalling of the pipeline and subsequently a degradation of all processing. To prevent this undesirable behavior, a scheduling algorithm may be defined to only perform specific memory accesses despite not always being successful. However, such an algorithm may result in missed opportunities to output a packet and subsequently lead to reduced output packet rates.

For example, a dequeuing mechanism can be implemented in software based on a "timing wheel" arrangement. In such an implementation, microcode executing on the processors constructs a "timing wheel" table that specifies which output channel to consider for dequeuing a processed packet. The timing wheel table represents an implementation of a scheduling algorithm and, as such, has entries that represent each of the various channels supported by the router. The range of channels may extend from, e.g., DS0 having a data rate of 64K bps to a Gigabit Ethernet (GE) having a rate of one Gps. Because the GE channel is much faster than the DS0 channel, there are more entries in the table for the former channel than for the latter DS0 channel. In other words, since the GE channel is serviced more often than the DS0 channel, there are more entries in the timing wheel table for the GE channel.

The microcode "walks" through the timing wheel table examining each entry to determine whether there is a packet available to be dequeued to the output channel associated with the entry. This represents an expensive operation from a processor resource consumption perspective primarily because of the number of conditions that need to be considered prior to rendering the dequeue decision (e.g., a packet is available in the output queue associated with the selected output channel and the selected output channel can receive the packet). Moreover, each task performed by a processor of the systolic array must generally be performed within a finite period of time (i.e., a phase) and, accordingly, those conditions must be analyzed and a decision rendered prior to the expiration of that phase. Furthermore within a phase, the processor may only have time to analyze one or two entries in the timing wheel without stalling the pipeline.

A problem with the software-based timing wheel table arrangement is that a packet may not be able to be dequeued (transmitted) each time the microcode accesses an entry of the table. One reason is that there may be no packet loaded into an output queue for a particular channel associated with the timing wheel table entry. Each entry that is accessed in the table that does not have a packet that can be dequeued presents a missed opportunity to transmit a packet. In other words, the microcode wastes time and misses potential dequeue opportunities by visiting entries represented in the timing wheel table that do not have a packet that can be dequeued (transmitted). This wasting of time consumes valuable resources and consequently can lead to a reduction in throughput.

Another condition that the processor must consider is whether or not there is sufficient capacity to transmit the packet over the internal data path to the selected channel. Using the conventional software approach, it is possible to "overload" the queues located at the "heads" of internal data paths that couple the arrays to the line cards. That is, even though there may be a packet in an output queue that requires servicing over an output channel, that packet may not be transmitted over the internal data path because of the limited bandwidth over that path. Here, an output command queue located at the head of the data path may be full (as indicated by, e.g., queue status information) such that it cannot accommodate the output packet. If the queue status indicates that a selected output channel cannot be serviced because the output packet cannot be dequeued, another opportunity to transmit a packet is lost.

A third condition that needs to be considered by a processor before it can transmit a packet over a selected channel is whether or not output buffers associated with the channel are full. Even though a packet may be available for transmission over a selected channel and there is capacity over the internal data path to provide that packet to the selected channel, there still may be a situation where the packet cannot be transmitted over a given output channel due to the fullness of small output buffers associated with the output channels. The status of these buffers is periodically monitored by the microcode to determine the fullness of these output buffers. Even though the two previous conditions may be met, it is possible that the microcode determines that it cannot transmit a packet over that channel because the output buffer is full.

Not being able to satisfy all the conditions necessary to transmit a packet over a selected channel within the allotted time phase results in a lost opportunity to transmit a packet from the router and, accordingly, adversely impacts the throughput of the router. The technique employed by the present invention addresses these problems associated with these conditions.

SUMMARY OF THE INVENTION

The present invention comprises a scheduling assist function (scheduling assist) that enables a processor to schedule events and be notified when these events expire. In addition, the present invention includes features that enable a processor to associate these events with output channels and enable the processor to quickly locate output channels (links) that are available and ready to be serviced. The invention takes advantage of the fact that the scheduling assist can be dedicated exclusively to scanning tables in its own dedicated memories looking for events that have expired and/or output channels that are available and not involve the processor in the search for output channels that are available and ready to be serviced.

Broadly stated, the scheduling assist operates as follows:
1) receives a request to schedule an event;
2) using information contained in the request, calculates an expiration time for the event;
3) determines if conditions are met to issue a notification; and
4) issues a notification if conditions are met.

According to the invention, an event is scheduled by issuing a request to the scheduling assist. In the illustrated embodiment of the invention, this request is in the form of a command that is issued by the processor to the scheduling assist. The command specifies an event number, an inverted rate and a length. The event number specifies the event being scheduled. The inverted rate and length are used in the calculation of an expiration time that is used to determine when the scheduled event has expired.

The scheduling assist keeps track of the scheduled event and checks its expiration time to determine if the time has been reached. Preferably, this function is performed using a number of tables. An event table holds specific information about the scheduled events. This information includes configuration information, an expiration time and status associated with the event. The configuration information includes various parameters associated with the event that are configurable by microcode. The expiration time is the time the event is set to expire. The status information includes indicators that can be read by the scheduling assist to determine the status of the event.

To determine if the expiration time for any of the scheduled events has been reached, the scheduling assist continuously compares the expiration times associated with the event to the current time. In particular, for every clock tick, the scheduling assist selects an entry in the event table and compares a group of event expiration times associated with that entry to the current time. If the expiration time is less than OR equal to the current time, the expiration time is deemed reached and conditions are met to issue a notification. Note that the term OR in capital letters is used herein to indicate a logical OR function and not an alternative structure.

In the preferred embodiment, the scheduling assist further determines if certain other conditions are met before it concludes that a notification can be issued. These other conditions include ensuring a notification can be placed on a notification queue, and checking the status of a command queue and flow bits of an output channel that is associated with the event.

If conditions are met to issue a notification, the scheduling assist issues a notification. This is preferably done by adding an entry to a notification queue and updating the status associated with the event. If a notification should not be issued, preferably the status information associated with the event is updated to indicate a notification is pending.

In an embodiment of the invention, a threshold feature is implemented to provide an early notification (i.e., a notification before the expiration time is reached). The threshold time defines a "notification window" in which a notification could be issued. This notification window is defined as the time represented by the "expiration time minus the threshold" and the expiration time. Using the threshold feature, a notification can be issued if the current time falls within the notification window.

The processor can use the scheduling assist to assist in the management of output channels by scheduling an event when a packet is dequeued to a channel and waiting for the scheduling assist to notify it when the channel is available and ready to be serviced again. Notably, the scheduling assist does not obviate a processor's ability to control the dequeuing process. That is, the processor is still able to define the dequeuing algorithm and, thus, retain the flexibility to switch to an alternative dequeuing algorithm simply by making a software change. In addition, the scheduling assist does not manipulate the contents of the output queues. This enables the processor to define the structure of the output queues and the methods employed to maintain the contents of the output queues.

Thus, when used to assist in the management of output channels, the inventive mechanism provides a significant processor offload for dequeuing operations without sacrificing flexibility for various dequeuing algorithms that can be implemented in software. The inventive scheduling assist can scan the events for expiration at orders of magnitudes faster than the previously described timing-wheel arrangement, while avoiding the problem of missed dequeue opportunities that arise because, as mentioned previously, the processor must render dequeue selections within a bounded period of time.

Moreover, the scheduling assist includes specific mechanisms (e.g., threshold feature) to ensure that the next packet can be dequeued prior to the output channel going idle and, at the same time, to avoid accumulation of time error by providing a "trigger" threshold for notification while continuing to check the expiration times to determine if an event has expired. The scheduling assist also includes tracking of flow control state information of the output channel corresponding to each event and deferring notification until the output channel is ready. This latter feature offloads such tracking tasks from the processor and again avoids missed dequeue opportunities if the software selected the output channel only to find that it is not available for dequeue at this time.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 3 is a functional block diagram of an application specific integrated circuit (ASIC) that implements the present invention;

FIG. 5C is a table of inverted rate values that may be advantageously used with the present invention;

FIG. 6B is a table that can be used to configure the scanning table that may be used to implement the present invention;

FIG. 7B is a table of scaling factors that can be used to implement the present invention;

DETAILED DESCRIPTION OF AN ILLUSTRATIVE EMBODIMENT

Figure 1:
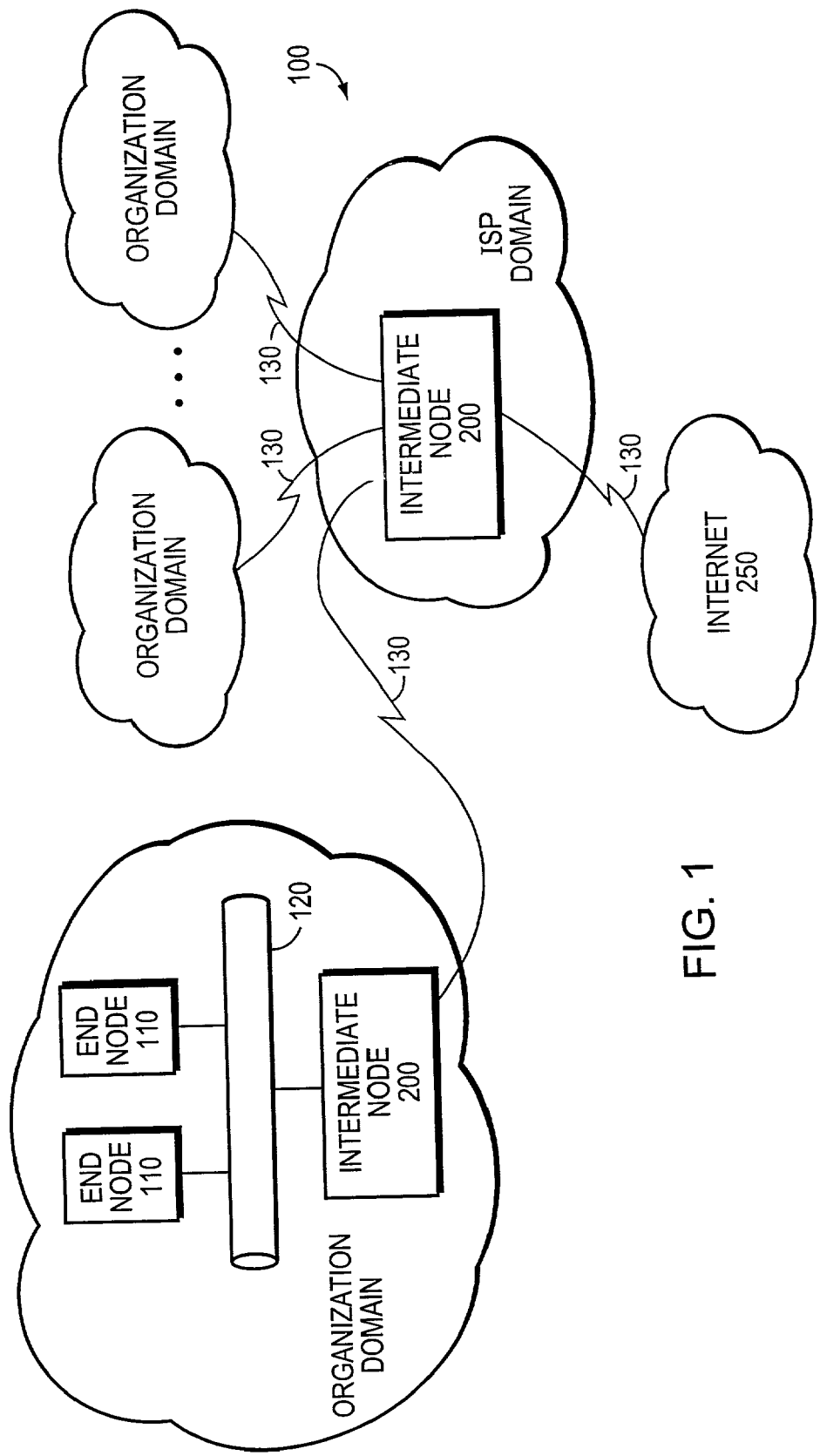
FIG. 1 is a schematic block diagram of a network including a collection of communication links and segments connected to a plurality of end and intermediate nodes.

FIG. 1 is a schematic block diagram of a computer network 100 comprising a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP).

Figure 2:
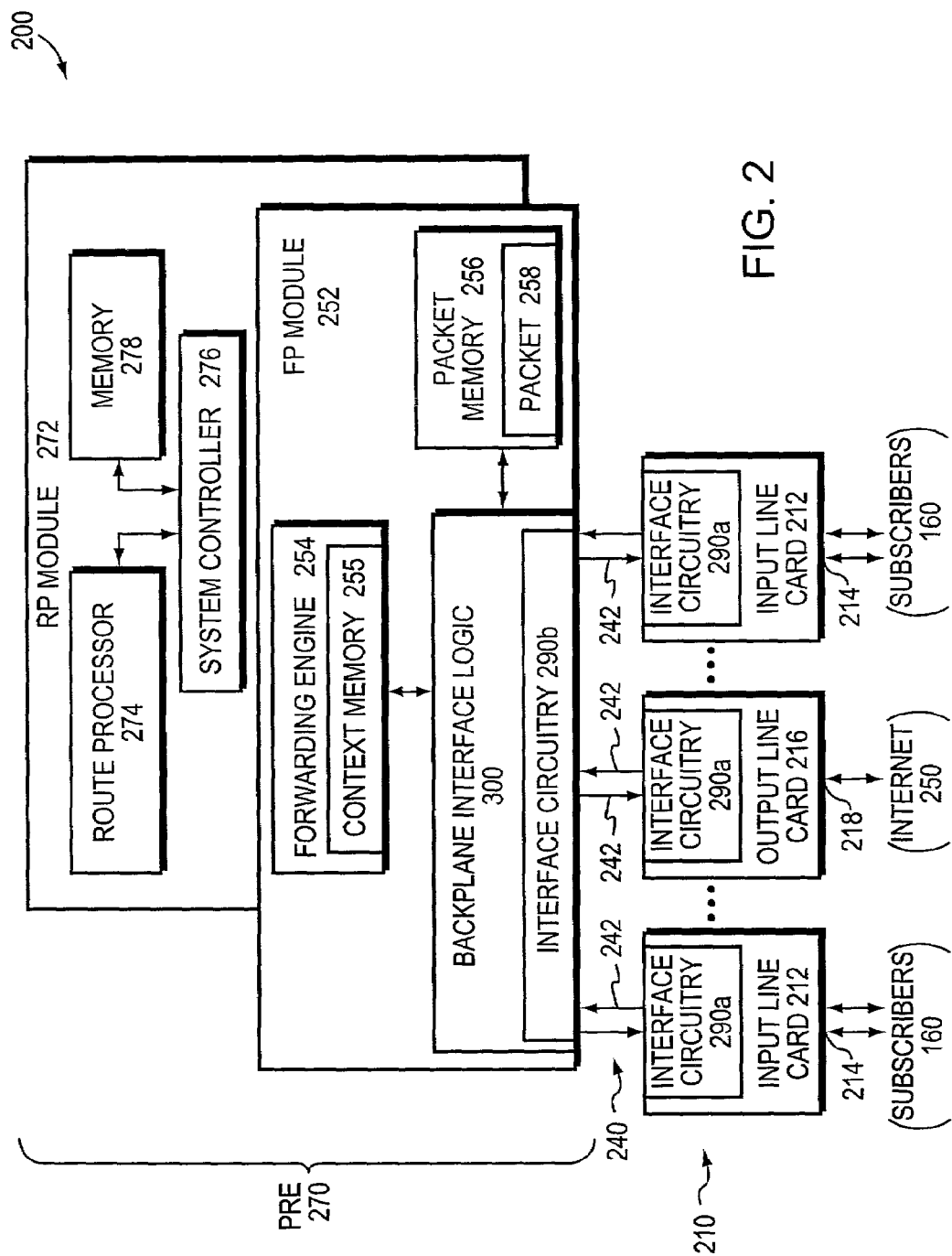
FIG. 2 is a schematic block diagram of an intermediate node, such as an aggregation or edge router that may advantageously implement the present invention.

FIG. 2 is a schematic block diagram of an intermediate node 200, such as an aggregation or edge router that may advantageously implement the present invention. The router 200 comprises a plurality of line cards 210 coupled to at least one performance routing engine (PRE) 270 via a unidirectional (i.e., point-to-point) interconnect system 240. The line cards 210 include a plurality of input cards 212 having input ports 214 and at least one output "trunk" card 216 configured to aggregate input data traffic over at least one output port 218. The line cards 210 are preferably configured to support interfaces and links of various data rates. For example, a line card may have a plurality of interfaces coupled to DS0 links while another line card may have interfaces coupled to Gigabit Ethernet links. Each link may have multiple channels associated therewith.

The PRE 270 is an assembly comprising a fast packet "forwarding" processor (FP) module 252 and a route processor (RP) module 272 adapted to perform packet forwarding and routing operations, respectively. The PRE assembly also provides quality of service (QoS) functions for complete packets received from each input line card 212 over the interconnect system 240. The interconnect system 240 comprises a plurality of high-speed unidirectional links 242 coupling the PRE 270 to each line card 210. The links are preferably clock forwarded links such that each unidirectional link comprises two data wires for transporting the data signals and one clock wire for carrying clock signals. However, it will be understood to those skilled in the art that the clock forwarding technique may scale to accommodate other clock forwarding arrangements such as, for example, four data wires for each accompanying clock wire.

The RP module 272 is a processor-based, routing system suite comprising functionality incorporated within a typical router. That is, the RP module comprises a general-purpose processor 274 (e.g., a MIPS route processor) coupled to a system controller 276 and memory 278. A network routing operating system, portions of which are typically resident in memory 278 and executed by the route processor, functionally organizes the router by, inter alia, invoking network operations in support of software processes executing on the router. The route processor (RP) 274 is configured to initialize various areas of the FP module 252 including constructing and loading various tables used by the FP module 252. The RP 274 also performs configuration management functions of the edge router 200 and communicates with neighboring peer routers to exchange protocol data units used to construct various routing tables in accordance with conventional routing algorithms.

The FP module 252 is responsible for rendering forwarding decisions for the router and, to that end, includes a forwarding engine (FE) 254 (such as an arrayed processing engine) coupled to a high-performance backplane interface logic circuit 300. The FE 254 is preferably embodied as two high-performance, application specific integrated circuits (ASICs) having a plurality of processors arranged as four (4) one dimensional (1-D) systolic array rows and eight (8) columns in a 4×8 arrayed configuration, wherein each column is coupled to a memory (not shown) called a column memory. However, it will be understood to those skilled in the art that other arrayed configurations, such as an 8×2 or 8×8 array, may be used in accordance with the present invention. The column memory preferably comprises synchronous dynamic random access memory (SDRAM) storage locations addressable by the FE 254 for storing software code and data structures accessed by the processors. The software code is preferably a binary, assembly language image or microcode adapted for execution by processors of the FE 254. It will be apparent to those skilled in the art that other memory means, including various computer readable media, may be used for storing and executing program instructions pertaining to the operation of the forwarding engine.

The edge router 200 illustratively includes sixteen (16) line cards 210, each of which may be configured to operate at various rates including but not limited to OC-12 (622 Mbps), DS0 and so on. The point-to-point links 242 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used is disclosed in co-pending and commonly-owned U.S. patent application Ser. No. 09/791,062, now issued as U.S. Pat. No. 6,973,072, titled High Performance Protocol for an Interconnect System of an Intermediate Network Node and is hereby included by reference in its entirety as though fully set forth herein.

Interface circuitry 290 coupled to the ends of the unidirectional links 242 is resident on both the line cards 210 and the backplane interface logic circuit 300. The backplane interface logic circuit 300 is also preferably embodied as a high performance ASIC, hereinafter referred to as the Cobalt ASIC, which is configured to further interface the line cards to a packet memory 256 of the FP module. The packet memory 256 preferably comprises SDRAM devices used to store packets 258 as the forwarding engine 254 determines where and when they should be forwarded within the router. For example, the packet memory 256 may be used to store low priority data packets while high priority, low latency voice packets are prioritized by the forwarding engine to an output card (e.g., the trunk card 216) of the router. An example of a backplane interface logic circuit that may be advantageously used with the present invention is disclosed in co-pending and commonly-owned U.S. patent application Ser. No. 09/791,063, titled High Performance Interface Logic Architecture of an Intermediate Network Device and is hereby included by reference in its entirety as though fully set forth herein.

The interface circuitry 290 includes interconnect ports coupled to the point-to-point links 242 of the interconnect system 240 and implements a unidirectional, point-to-point clock forwarding technique that is configured for direct ASIC-to-ASIC transmission over a backplane of the router. As a result, the interface circuitry 290*a* resident on the line cards 210 is preferably embodied within a high-performance ASIC, hereinafter referred to as the Barium ASIC, whereas the interface circuitry 290*b* is resident on the Cobalt ASIC. The interface circuitry generally converts conventional formats of data received at the line cards 210 to a protocol format for transmission from, for example, the Barium ASIC over the interconnect system 240 to the Cobalt ASIC. The ASICs also include circuitry to perform, among other things, cyclic redundancy code (CRC) generation and checking on packets, along with interconnect format checking.

FIG. 3 is a functional block diagram of the Cobalt ASIC 300. The functional blocks represented include a From Backplane Buffer (FBB) 310, an Internal Packet Memory (IPM) 315, a To Forwarding Engine Interface (TFEI) 330, a Route Processor Interface (RPI) 335, a scheduling assist 340, a From Forwarding Engine Interface (FFEI) 350, a command execution unit 355, an Output Command Queue Controller (OCQC) is 360, a Packet Memory Controller (PMC) 370 and To Backplane Buffer (TBB) 390.

One of the primary functions of the FBB 310 is to interface the Cobalt ASIC 300 to the line cards 210. The FBB 310 primarily serves as a speed-matching buffer to match the low data rate of the line cards to the higher speed data rate internal to the Cobalt ASIC 300. The FBB 310, also, extracts flow bit information from received packets and sends this information to the scheduling assist 340 for further processing. The received packets are then stored in the internal packet memory (IPM) 315.

The primary function of the TFEI 330 is to interface the Cobalt ASIC 300 to the forwarding engine 254. To that end, it contains logic to provide speed matching between the Cobalt ASIC 300 and the forwarding engine 254. In addition, the TFEI generates various contexts that it uses to communicate with the forwarding engine 254. These contexts include a new work context that is generated for each packet received, a feedback context that is the result of feedback data to be sent to the forwarding engine (e.g., in response to a command issued from the forwarding engine) and null contexts.

The RPI 335 provides an interface between the Cobalt ASIC 300 and the route processor (RP) 274. In the illustrated embodiment of the invention, this interface is an industry-standard PCI/PCI-X bus that is 32-bits or 64-bits wide and operating at up to 66 MHz as a PCI bus or 133 MHz as a PCI-X bus. The RPI 335 also provides "slave" access to various internal registers contained within the Cobalt ASIC and to external packet memory. Moreover, the RPI 335 provides DMA mastering for moving packets between the RP 274 and the Cobalt ASIC 300.

The FFEI 350 receives contexts that are generated by the forwarding engine 254 and executes commands contained therein using the Command Execution Unit 355. Commands directed to sending packet data to the line cards, the RP 274 or IPM replay logic (not shown) are passed to the output command queue controller (OCQC) 360. All other commands are processed by the command execution unit 355 in the order in which they are received. These other commands include commands that are used to control the packet buffer controller logic 370, as well as commands that are directed to controlling the scheduling assist 340.

The scheduling assist 340 provides a timer assist function that enables the microcode (running on the forwarding engine 254) to schedule events and be notified when those events have expired. As described herein, the scheduling assist contains sufficient logic to allow the microcode to control up to 20K separate events. The events can be mapped to a line card channel or be used for other purposes defined by the forwarding engine 254.

The OCQC 360 handles the transfer of packet data from the external packet memory 256 to the line cards 210 and the route processor 274. The OCQC 360 preferably provides 18 separate queues, one for each output line card, one for the route processor 274 and one for the IPM replay logic (not shown). These queues store the output commands (requests) that were received from the command execution unit 355.

The PMC 370 manages access to the external packet memory 256 and is responsible for servicing requests to the packet memory from the RPI 320, the FFEI 350 and the OCQC 360.

The TBB 390 provides a small amount of buffering between the external packet memory 256 and the line cards 210. The TBB 390 also provides buffering for packets destined for the RP 274 through the RP interface 320 and the IPM replay logic (not shown).

Broadly stated, a packet is initially received at an input port 214 of a line card 212 and, after minimal buffering, is sent over a point-to-point link 242 to the Cobalt ASIC 300 where it is temporarily stored in the IPM 315. During normal packet processing, the Cobalt ASIC sends an original header of the packet to the forwarding engine 254 for processing. Each processor has a limited amount of time (i.e., a phase of execution) to process its packet without impacting the flow of packets through the engine and negatively impacting packet throughput. The Cobalt ASIC holds the entire packet, both header and trailer, in the IPM 315 until receiving further instructions from the forwarding engine 254.

Specifically, for each packet received by the Cobalt ASIC 300 from a line card 212 over the interconnect system 240, the TFEI 330 generates a context (e.g., a new work context). This context is used to notify the forwarding engine 254 that a complete new packet is available in the IPM 315. The original header of the packet is then copied into the new work context and passed to the forwarding engine 254 where it is stored in a context memory 255 associated with each processor of the engine 254.

Figure 4A:
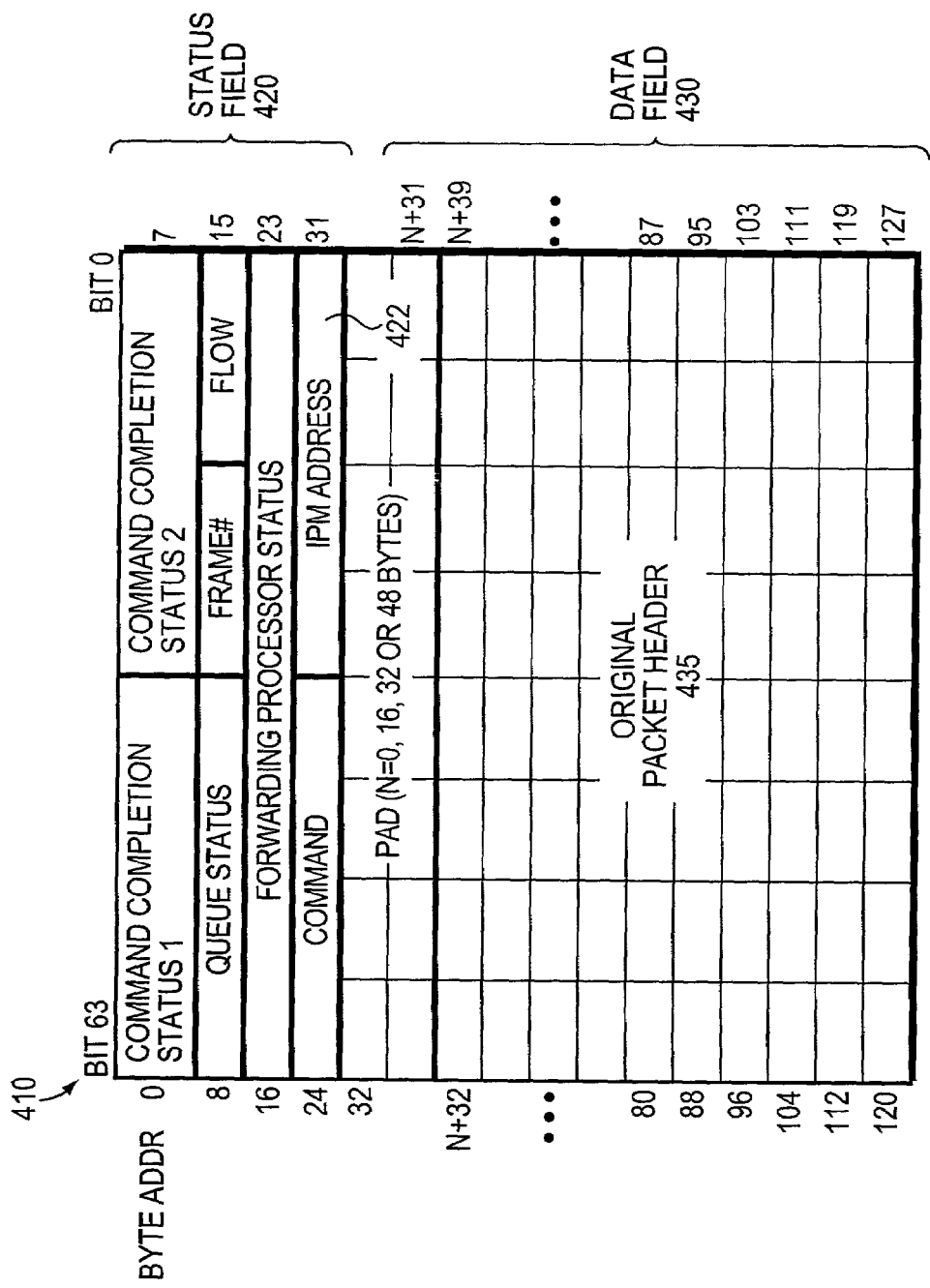
FIG. 4A is a schematic block diagram of a new work context that may be advantageously used with the present invention.

FIG. 4A is a schematic block diagram of the new work context 410 that, illustratively, is 128 bytes in length. A 32-byte status field 420 contains various status (state) information, such as output command completion status, queue status and forwarding processor status. Also included within the status field 420 is an IPM address field 422 that is set to the original starting address of the complete packet in the IPM 315. The remainder of the context, i.e., a data field 430, accommodates an original packet header 435 that is modified by the forwarding engine 254.

The forwarding engine 254 generates a new modified packet header and computes a starting address of the packet trailer in the IPM 315. The forwarding engine 254 delivers the modified packet header, along with, among other things, move commands, to the FFEI 350 in a "processed" context.

Figure 4B:
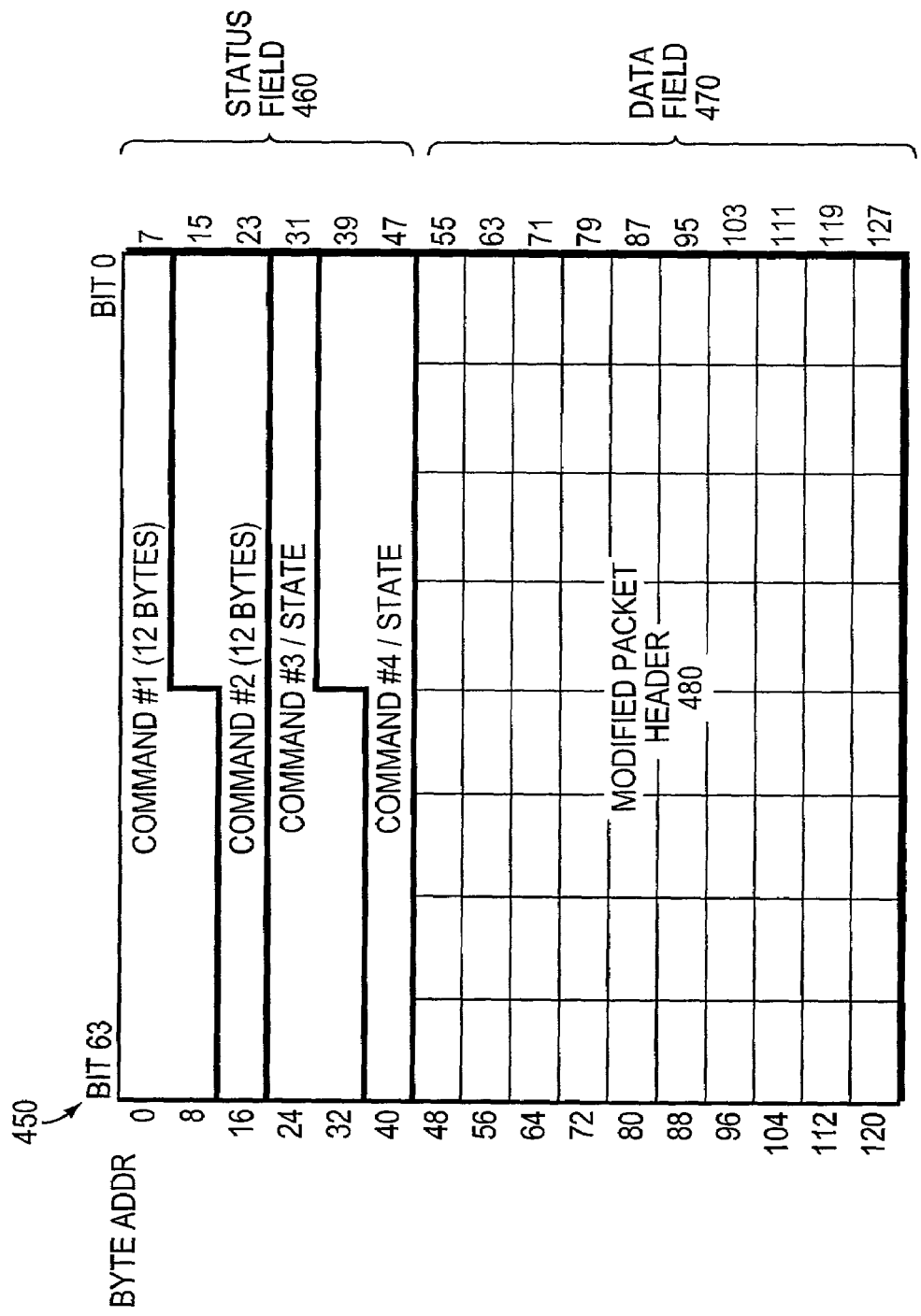
FIG. 4B is schematic block diagram of a processed context that may be advantageously used with the present invention.

FIG. 4B is schematic block diagram of a processed context 450 that is delivered by the forwarding engine 254 to the FFEI 350. A status field 460 of the context typically contains a plurality of move commands that are preferably executed in order, starting with command #1. The move commands typically instruct the Command Execution Unit 355 to move the modified packet header 480 (stored in data field 470) from the processed context 450, along with the associated packet trailer from the IPM 315 at the computed starting address, to the packet memory 256.

The forwarding engine 254 processes (modifies) the original packet header in accordance with a forwarding decision operation. The forwarding decision includes selection of an output link (channel) over which to forward the processed packet. To that end, the forwarding engine 254 returns a modified packet header along with several commands that instruct the Command Execution Unit 355 to move the header and its packet trailer into the packet buffer 256 where they are merged to create an output packet for transmission from the edge router.

In addition, the forwarding engine 254 executes an enqueue operation that loads a pointer into an output queue (stored in the column memory). The value of the pointer points to the location in the packet buffer 256 where the output packet resides. The output queue to which the forwarding engine writes the pointer is associated with a particular output channel. There may be more than one output queue associated with an output channel; the selection of the output queue to which a pointer is loaded for a particular output channel is made via a QoS decision as part of the forwarding decision.

At an appropriate time, the forwarding engine 254 generates commands that instruct the OCQC 360 to move the merged packet from the packet memory 256 to an appropriate output channel of a line card 210. This operation, referred to as a dequeue operation, is decoupled from the enqueue operation. The dequeue operation involves selecting a particular output channel over which to transmit an output packet, whereas the enqueue operations involves selecting the particular output queue (QoS) for servicing that channel. Although the enqueue operation is decoupled from the dequeue operation, it is possible for both operations to occur within a single context that is processed by the forwarding engine. That is, in addition to processing an input packet within the context, processors of columns within the forwarding engine also perform a dequeue operation to select an output channel over which an output packet may be transmitted.

The channel selection aspect of the dequeue operation may be implemented in software using a conventional timing wheel arrangement, as previously described. However, the microcode may select an entry associated with a particular channel as the next channel to be checked for purposes of transmitting a packet and the output queue associated with that channel may be empty or the channel may be unable to accommodate transmission of the packet. This may result in a missed opportunity to transmit a packet particularly if the processor does not have sufficient time within its phase of execution to check another output channel over which to output a packet. Missing an opportunity to transmit a packet may adversely impact the throughput of the edge router. The present invention is directed to providing a mechanism that increases the likelihood of selecting a channel and queue that are available for transmitting a packet from the router.

The present invention relates to a scheduling assist function (scheduling assist) that can be used to offload certain aspects of the dequeuing operation from the microcode executing on the forwarding engine 254. Specifically, the scheduling assist 340 cooperates (interacts) with the microcode to determine if a particular output channel is able to receive a packet. When used in this manner, the scheduling assist function 340 replaces the conventional timing wheel arrangement and its use when implementing the dequeuing operation within the microcode. Rather than relying on a timing wheel arrangement to select a channel for output and potentially missing an opportunity to transmit a packet, the microcode merely instructs the scheduling assist 340 to notify it when an output channel becomes available so that it can dequeue a packet to the output channel.

Figure 5A:
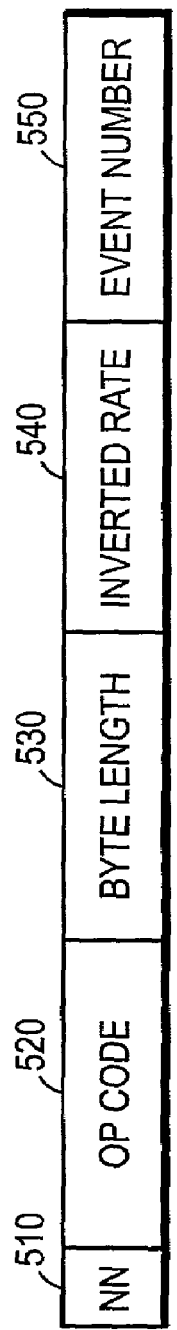
FIG. 5A is an illustration of a configuration information entry associated with a scheduled event that may be advantageously used to implement the present invention.

One aspect of the present invention is the ability of the scheduling assist to process a request in order to schedule an event. Here, the microcode requests that an event be scheduled by issuing an update event time command to the scheduling assist 340. FIG. 5A illustrates the update event time command according to the illustrated embodiment of the present invention. The update event time command contains a no notification field (NN) 510, an operational code (opcode) field 520, a byte length field 530, an inverted rate field 540 and an event number field 550.

The no notification field 510 is a one-bit flag that allows the microcode to specify whether or not a notification is to be sent by the scheduling assist to the microcode when the appropriate conditions warranting a notification have occurred. Asserting the flag disable notifications. Deasserting the flag enables notifications. Normally, this flag is deasserted, however, there may be certain situations where the microcode wishes not to be notified and the flag is asserted. For example, if a packet is to be dequeued to an output channel and there are no other packets in the output queue associated with the output channel, the microcode may simply wish to schedule an event for future reference and not be notified when the event expires.

The content of the opcode field 520 identifies the command is an update time command. That is, this field directs the Command Execution Unit 355 to treat this command as an update time command and process it accordingly.

The event number field 550 contains an event number value that specifies the event being scheduled. The value of this field is used as an index into an event table to select the event being scheduled.

The byte length field 530 contains a value indicating the size of the packet (in is bytes) that is being dequeued. The inverted rate field 540 contains a value that specifies the rate (speed) of the output channel. The scheduling assist uses the values of the byte length field 530 and the inverted rate field 540 to calculate an expiration time that is associated with a scheduled event.

Figure 5B:
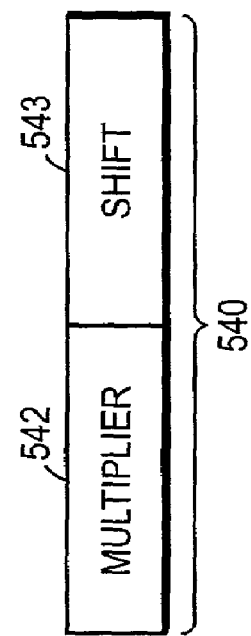
FIG. 5B is an illustration of the inverted rate field contained in the configuration information that may be advantageously used to implement the present invention.

FIG. 5B illustrates the inverted rate field 540 comprising a multiplier field 542 and a shift field 543, as illustrated in FIG. 5B. The multiplier field 542 contains a value that represents the line rate (transmission rate) of the output channel that is associated with the event. The shift field 543 contains a scaling factor that is to be applied to the multiplier value contained in the multiplier field 542.

The actual values that are specified in the multiplier 542 and shift 543 fields depend on a number of factors. For example, in the illustrated embodiment of the invention, the current time is the value of a free running current time counter that is clocked at the system clock rate. The scheduling assist uses this current time counter to determine when an event has expired. Thus, the values specified for the multiplier field 542 and the shift field 543 depend on the clocking rate of the current time counter. Further, where the scheduling assist is used to assist in the management of output channels, the multiplier and shift field values are dependent on the channel rate of the output channel associated with the event. In addition, other factors that may be considered when choosing the multiplier and shift field values include an assumed minimum (worst-case) packet size.

FIG. 5C is a table of multiplier and shift values that can be used with the illustrated embodiment. The values are based on transmitting a 65 byte packet at the various specified channel rates. The table is divided into two major columns based on the clocking rate of the current time counter. One column specifies the multiplier and shift values used for a clocking rate of 150 MHz and the other column specifies the multiplier and shift values used for a clocking rate of 200 MHz.

In the illustrated embodiment, the line rate of the output channel is represented using an inverted rate value. This is done primarily as an optimization. By using an inverted rate value, high speed multiplier hardware can be used to perform various calculations that ordinarily would be performed using division hardware. It should be noted, however, that representing the line rate as an inverted rate value is not a limitation of the invention. Rather, other representations for line rate may be used including a non-inverted rate value.

It should be further noted that in the illustrated embodiment, the inverted rate is defined as comprising a multiplier and shift value. This is done primarily as an optimization. By specifying the inverted rate in this manner, a wide range of channel rates can be represented while limiting the amount of logic and memory needed to provide a similar precision to the timing of the events.

Figure 6A:
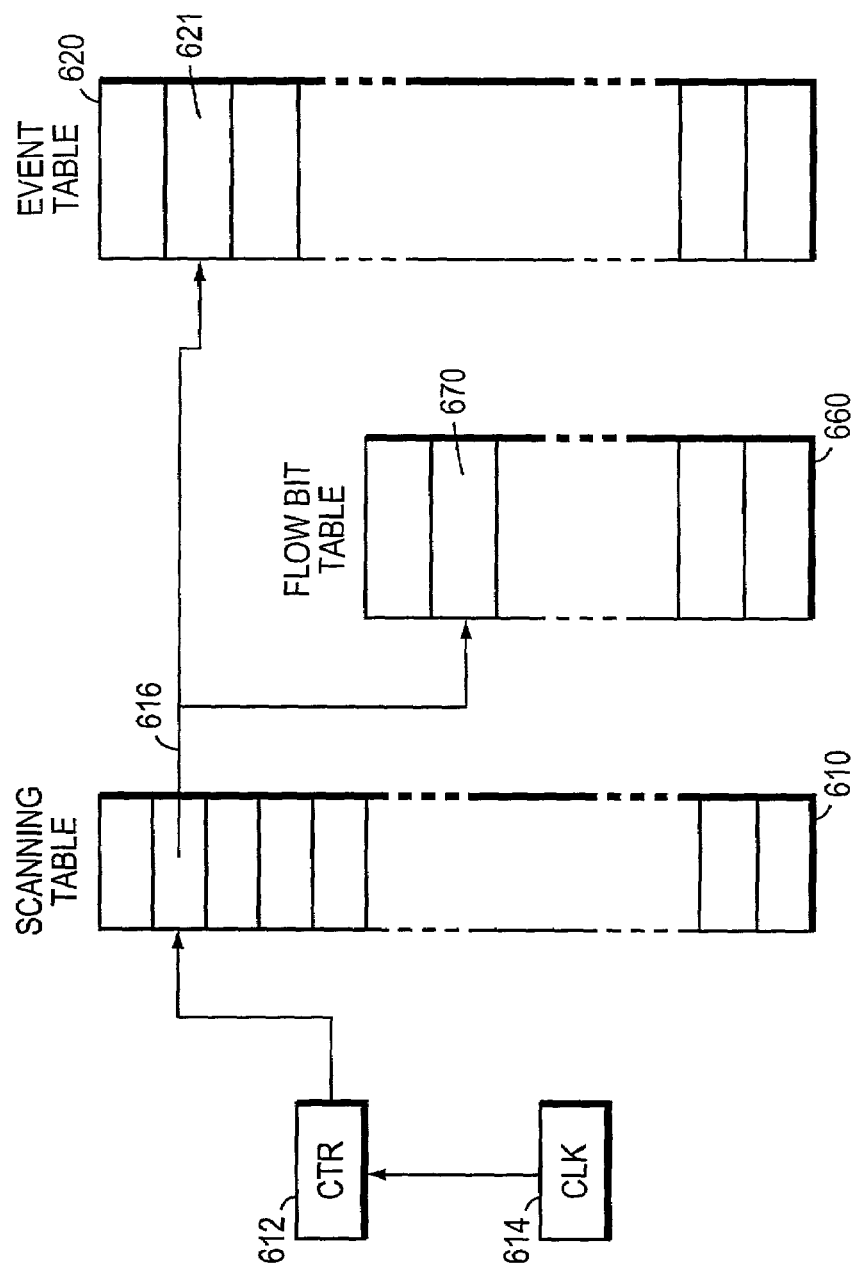
FIG. 6A is an illustration of a scanning table and an event table that may be used to implement the present invention.

Another aspect of the present invention is the ability of the scheduling assist to manage the scheduled events using various tables. FIG. 6A is a block diagram of three of these tables which include a scanning table 610, an event table 620 and a flow bit table 660.

The scanning table 610 defines the rate at which a given expiration time associated with an event is checked to determine if the expiration time has been reached (i.e., event has expired). The table is organized as a number of entries, each of which contain an index 616 that is used to select a specific entry 621 in the event table 620 and its associated entry 670 in the flow bit table 660. The value of the entries in the scanning table 610 are set by the RP 274 through a special write port that is accessible to the RP 274.

The scanning table 610 is indexed using a "wrap-around" counter 612 that is clocked by a clock source 614. The output of the counter 612 selects an entry in the scanning table 610. The selected entry, in turn, provides the index 616.

The scanning table 610 is scanned in a circular fashion starting from the first entry to the last entry and wrapping back around to the first entry. This circular scanning method is accomplished using the wrap-around counter 612 and the clocking circuit 614. Specifically, the counter 612 provides an address (index) to the scanning table 610 to select a particular entry in the table. At every other clock cycle, supplied by the clocking circuit 614, the counter 612 increments by one. The counter 612 is configured such that when it reaches the last entry in the scanning table 610, it wraps around to select the first entry on the next clocking cycle. In the illustrated embodiment, the clocking circuit 614 is designed to operate at either 150 Mhz or 200 Mhz.

The rate at which a particular expiration time for a given event is checked is defined by the number of entries in the scan table that point to the event table entry associated with that event. The greater the number of entries in the scanning table associated with an event table entry, the faster the rate at which the expiration timer associated with that event is checked.

In the illustrated embodiment of the invention, up to 20K events can be scheduled. As an optimization, each entry in the scanning table 610 is organized such that each scanning table entry corresponds to a group of 8 events. In this embodiment, the scanning table is organized as an 8K×12-bit table where each entry is 12 bits in length and points to one of the 2560 sets of 8 events to be examined in the event table. For each selected scanning table entry, 8 expiration time values are selected for comparison to the current time to determine if the expiration time has been reached. By selecting a set of 8 entries every other clock tick, the invention is not only 16 times faster than the previous microcode embodiment, but is actually 8×16 or 128 times more responsive or more likely to find an event that requires servicing than the previous embodiment.

FIG. 6B illustrates a table that can be advantageously used to configure the scanning table to implement various scan rates for events that are associated with dequeuing packets to output channels. In general, events associated with slower channel rates need not be scanned as often and thus do not require as many entries in the scanning table as those events that are associated with higher channel rates.

It should be noted that in the illustrated embodiment the scanning table contains 8192 entries. This size provides a sufficient dynamic range between DS0 channels which require only one entry and OC48 channels which require 4096 entries. However, it should be noted that this is not a limitation of the invention. Rather, other sizes can be used depending on the requirements of the system.

Figure 6C:
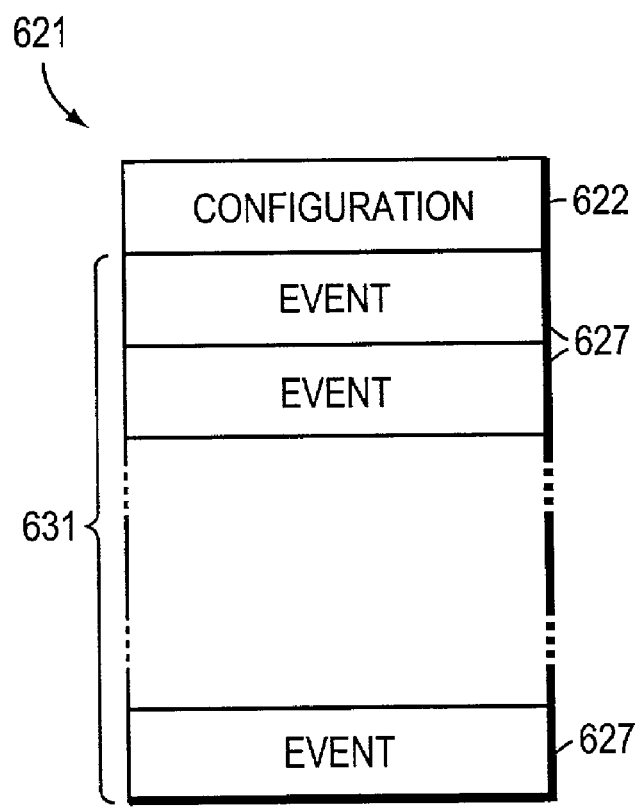
FIG. 6C is a detailed illustration of an event table entry that may be used to implement the present invention.

The event table 620 (FIG. 6A) is comprised of a plurality of event table entries. FIG. 6C is an illustration of an event table entry 621 that can be advantageously used to implement the present invention. The event table entry 621 is comprised of a configuration field 622 and a group 631 of one or more event fields 627. Each configuration field 622 is associated with a group of eight (8) events. All events in the group preferably share the same configuration information represented in the configuration field 622.

Grouping events into a single entry is done primarily as an optimization. By grouping events, the amount of memory needed to implement the event table 620 can be reduced as multiple events share the same configuration information. In addition, this grouping arrangement allows multiple events to be checked at one time, thus allowing the examination of several expiration times in the same clock cycle and further reducing the amount of time necessary to examine the events in the table.

In the illustrated embodiment, 8 events comprise a group of scheduled events (i.e., a grouping factor of 8). However, it should be noted, that this is not a limitation of the invention. Rather, one could use groups that are comprised of more than 8 events or less than 8 events. One tradeoff to consider when choosing a grouping factor is the complexity of the design necessary to implement the grouping factor versus the amount of time necessary to check the scheduled events. If the complexity of the design is not a concern, one may wish to choose a large grouping factor to reduce the amount of time necessary to check the scheduled events. If time is not a concern, one may wish to choose a small grouping factor to reduce the complexity of the design necessary to check the scheduled events.

Figure 6D:
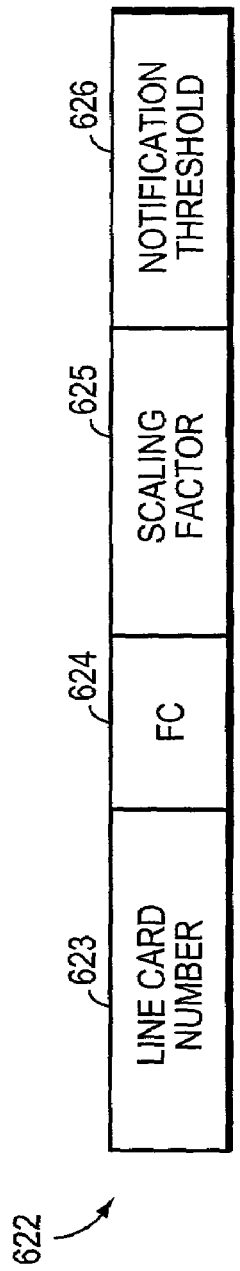
FIG. 6D is an illustration of a configuration information entry associated with a scheduled event that can be used to implement the present invention.

FIG. 6D illustrates the format of the configuration field 622 associated with a group of scheduled events. The configuration field 622 comprises a line card number field 623, a flow control enabled field (FC) 624, a scaling factor field 625 and a notification threshold field 626.

The line card number field 623 defines the "line card number" associated with the group of scheduled events. The value of this field corresponds to the output command queue that is associated with the scheduled events in the group and is used by the scheduling assist to locate the command queue, as well as an output command queue status bit associated with the command queue. In the illustrated embodiment, this field is five (5) bits in length and if the field is set to a value that is greater than 17 (the highest resource that has an output command queue associated with the resource), then the output command queue status is not used in the decision to determine if a notification should be issued.

The flow bit enabled field 624 indicates whether or not the flow bit associated with an event is used in the decision to determine if a notification should be issued. This field preferably is one (1) bit in length. When the bit is asserted, the scheduling assist uses flow bit information associated with the event to determine if a notification should be issued or deferred. When this bit is not asserted, the flow bit information associated with the event is not used in the decision to determine if a notification should be issued.

The scaling factor field 625 defines the time scale that is used to scale the expiration times associated with the group of scheduled events. The scaling factor is an optimization that is used by the scheduling assist to reduce the size of the event table 620. The scaling factor is used to drop certain least significant bits that are insignificant for event time purposes. Since these bits are insignificant, they need not be represented in the table. Thus, the scaling factor acts as an optimization in that it reduces the amount of logic that is necessary to represent each event's expiration time in the event table 620. In the illustrated embodiment of the present invention, the scaling factor field is 3 bits in length. The value for the scaling factor is determined using the following equation: "scaling factor value"="number of bit positions to shift"*2.

The notification threshold field 626 holds a notification threshold value that is associated with the group of scheduled events. This value is preferably thirteen (13) bits in length and reflects the value of the actual threshold reduced by the scaling factor 625. The notification threshold value is a time value used to provide an early notification to the forwarding engine before the expiration time is reached. If the expiration time of the event minus the notification threshold value is less than OR equal to the current time, a notification could be issued.

Figure 6E:
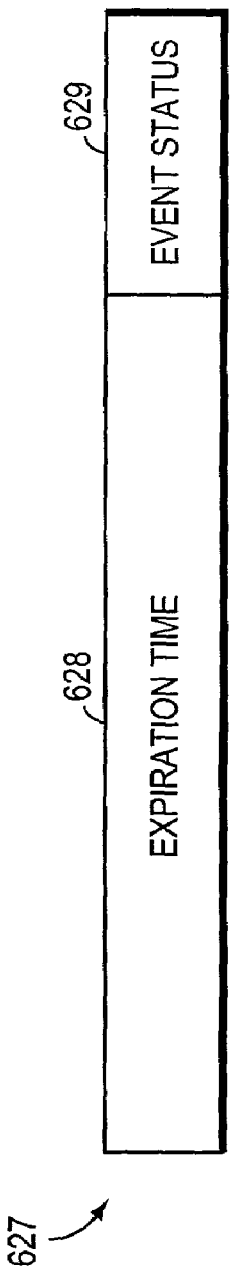
FIG. 6E is an illustration of a scheduled event entry that can advantageously be used to implement the present invention.

FIG. 6E is a detailed illustration of the event field 627 comprising an expiration time field 628 and an event status field 629.

The expiration time field 628 contains the expiration time associated with the scheduled event. This expiration time is used by the scheduling assist to determine when the scheduled event has expired. In the illustrated embodiment of the invention, the expiration time field 628 is sixteen (16) bits in length and the expiration time contained in the field is scaled by the value of the scaling factor field 625 associated with the event.

The event status field 629 holds status information that is associated with the event. In the illustrated embodiment of the invention, the event status field is a two (2)-bit field that holds the following binary status information:

00—indicates that no event is scheduled and there is no notification pending (i.e., the event is idle);

01—indicates an event is scheduled and there is no notification pending (i.e., the expiration time has not been reached);

10—indicates an event is not scheduled and there is a notification pending (i.e., the expiration time has been reached but the notification has been deferred);

11—indicates an event is scheduled and a notification has been issued (i.e., the notification time has been reached and either a notification has been issued or no notification was requested).

The event table preferably is divided into two basic sections, one section to hold configuration and expiration time information and the other section to hold the status information.

The portion that holds the configuration and expiration time information is preferably implemented as a 1280 by 150-bit memory with 1 read port and 1 write port and a shared address. The address is driven by the output of the scanning table 610 on even cycles. On odd cycles, the address is shared by the RP 274 for reading and configuring entries and by the scheduling assist for updating the expiration time when an update time command is received from the forwarding engine 254. In another embodiment of the invention, the read and write ports have separate addresses (i.e., they are not shared). In this embodiment, the memory can be accessed through either the read or write port every cycle.

The portion of the table that holds the status information is preferably implemented as a 2560×16-bit on-chip memory where the 16 bits are divided into 2 bits for each of the 8 events in the same event table entry. This portion is preferably embodied as a separate on-chip memory since it requires writing from two sources at the same time, i.e., as part of the scanning operation and from commands issued by the forwarding engine 254 (unlike the configuration and expiration time potion). The write port is controlled by the output of the scanning table 610 on even cycles. On odd cycles, the write address is shared by the RP 274 for writing entries and by the scheduling assist 340 for updating the event status when a new command is received from the forwarding engine 254. The RP 274 waits on write operations if the scheduling assist 340 is updating an event status. The read port has a separate address that is driven by the output of the scanning table 610 on even cycles and by the RP 274 to read the table on odd cycles.

The flow bit table 660 holds flow bit information for the output channels. Each entry 670 holds the latest value of the flow bit that was received on its associated output channel. There is a one-to-one correspondence of the entries in the flow bit table with the entries in the event table 620.

Figure 6F:
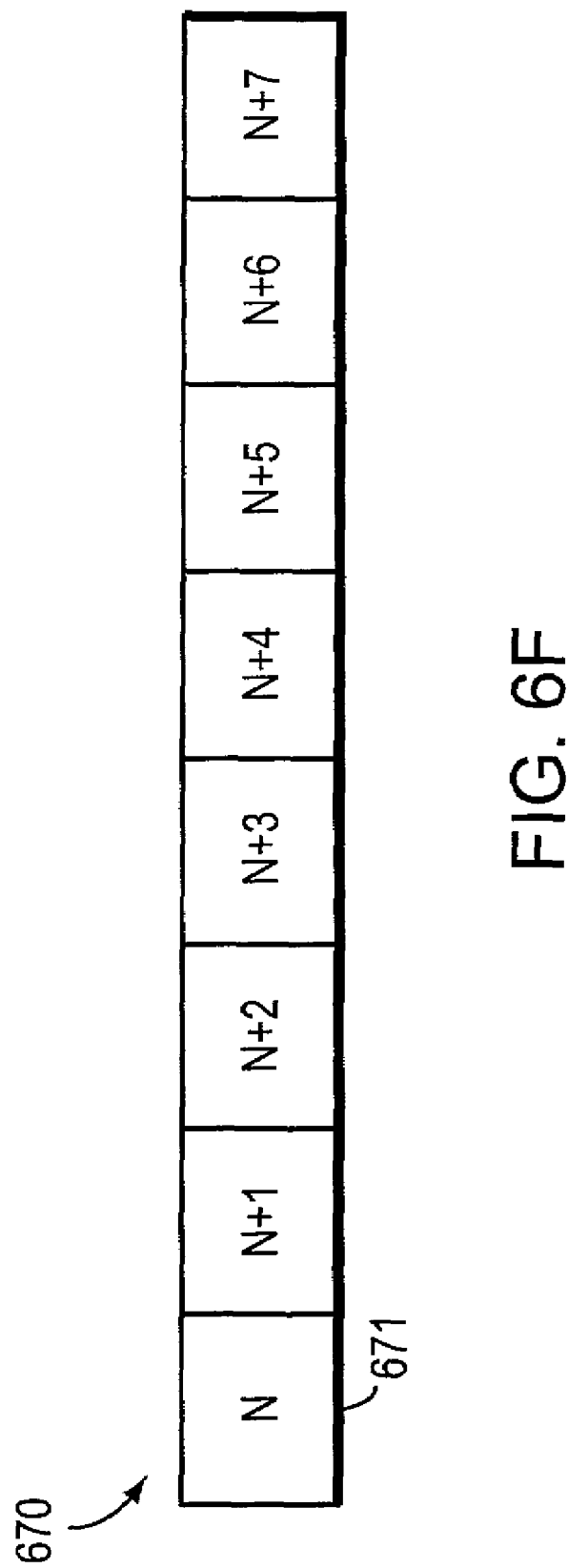
FIG. 6F is an illustration of a flow bit table entry that can be advantageously used to implement the present invention.

FIG. 6F is a detailed illustration of a flow bit table entry 670 organized as a group of flow bit values. This group of flow bit values are associated with the group of events 631 that comprise an event table entry 621. Each event in the group of events has a corresponding flow bit value 671 in the flow bit table entry 670. Thus, for example, the flow bit labeled "N" corresponds to the first event in event group 631, the flow bit labeled "N+1" corresponds to second event in the event group 631, and so on.

In the illustrated embodiment of the invention, the flow bit table is implemented as a 2560×8-bit on-chip memory, where the 8-bits consist of the set of 8 flow bits corresponding to the 8 events in the event table 620. It has 1 read port indexed by the scanning table on the event cycles and has 1 write port with a separate address that is indexed by a flow bit table manager 830 when a flow bit needs to be written or by the RP 274, otherwise.

As mentioned previously, the scheduling assist can be used to assist in the management of output channels or be used for other purposes defined by the forwarding engine. When used to assist in the management of output channels, the events that are scheduled can be used to determine when a next packet can be dequeued to an output channel. A typical interaction between microcode and the scheduling assist when used for this purpose is as follows:

1) the microcode sends a command to the Cobalt ASIC to output (dequeue) a packet on a given output channel;
2) the microcode sends an update time command to the scheduling assist to instruct it to notify the microcode after a certain period of time (typically, the time it takes to send the dequeued packet based on the size of the packet at the speed of the output channel);
3) the scheduling assist adds the request time to the expiration time currently in the event field associated with the output channel;
4) when the expiration time has been reached, the scheduling assist performs additional checking of certain status information to determine if a notification should be issued;
5) if a notification should be issued, a notification is placed in the notification queue, otherwise, the notification is deferred.

When the scheduling assist receives an update time command it selects the appropriate event table entry 621 in the event table 620, calculates a new expiration time, sets the new expiration time in the event field associated with the event and updates the event status associated with the event, if necessary.

The appropriate event table entry 621 is selected using the event number 550 specified in the update time command. The event number 550 is divided by the number of events in a group (i.e., grouping factor) to calculate an index value. This index value is used as an index into the event table 620 to locate the event table entry 621 that is associated with the event number 550. Once the event table entry is selected, the actual event entry 627 associated with the event number 550 can then selected using modulo arithmetic.

Figure 7A:
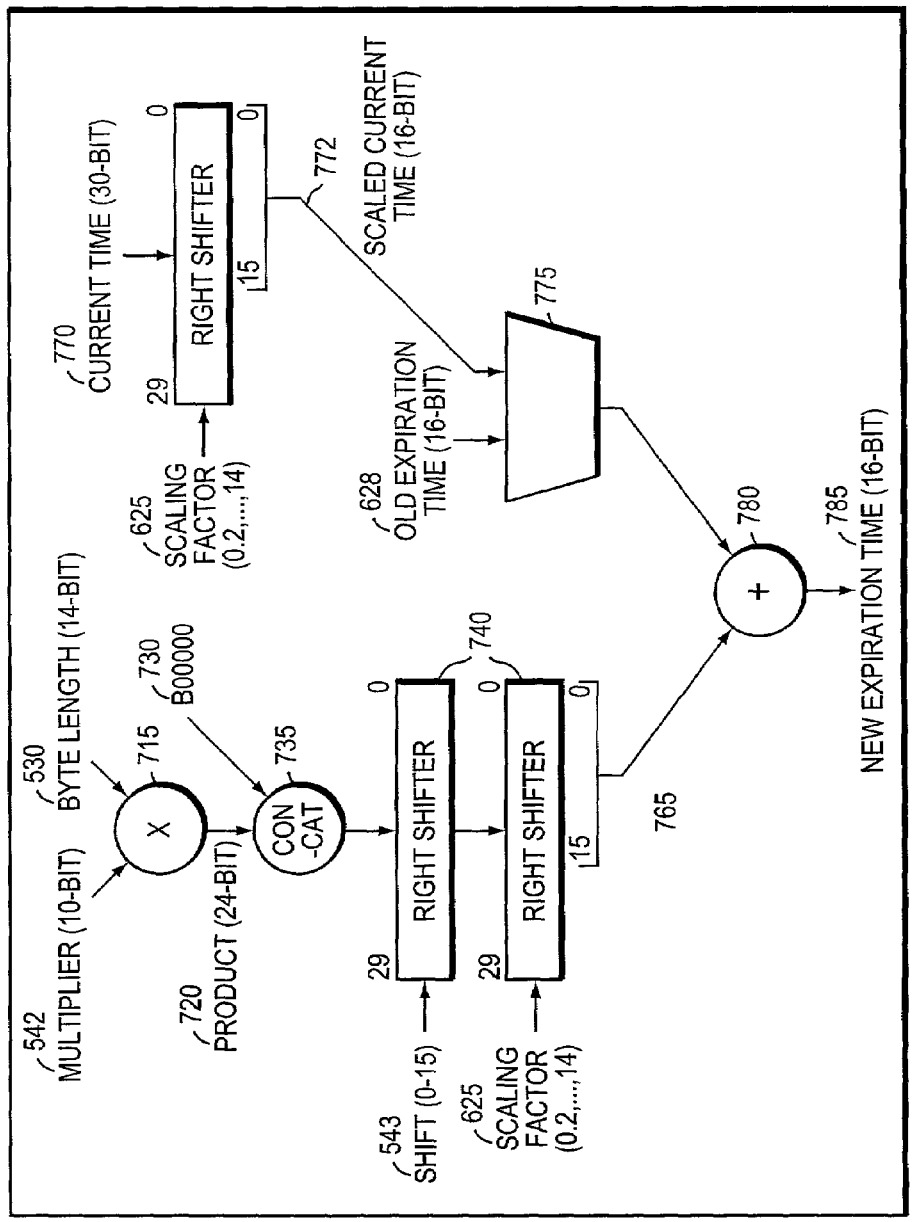
FIG. 7A is an illustration of the procedure for calculating a new expiration time that can be advantageously used to implement the present invention.

The calculation of the new expiration time involves a number of steps. FIG. 7A is a logical flow diagram illustrating the procedure for calculating the new expiration time. The number of bytes specified in the byte length field 530 of the update time command is multiplied 715 by the multiplier field 542 to produce a product 720. Five bits (all set to zero) 730 are then concatenated 735 to the least-significant digits of the product 720 and the resultant value is placed in a shift register 740. This value is then reduced (right-shifted) a number of places specified in the shift field 543 of the update time command. The result is then right shifted the number of bits specified by a scaling factor value held in the scaling factor field 625 of the configuration entry 622 associated with the event. The result is the scaled expiration time. The least-significant 16-bits of the scaled expiration time is the delta time 765. This delta time 765 is fed into an adder 780 and is added to the output of the multiplexer 775.

The output of the multiplexer 775 is determined as follows. The current time 770 is reduced (right-shifted) using the scaling factor specified in the scaling factor field 625 to produce a scaled current time. The least-significant 16-bits of this result 772 is then fed to the multiplexer 775. Likewise, the old expiration time 628 associated with the event from the selected event table entry 621 is fed to the same data multiplexer 775. The multiplexer 775 selects either the scaled current time 772 or the old expiration time 628. If the event is idle, that is no event is scheduled or the expiration time has been reached for the previously scheduled event, the multiplexer 775 is conditioned to select the scaled current time 772. If an event is not idle (i.e., an event is already scheduled and its expiration time has not been reached), the multiplexer 775 is conditioned to select the old expiration time 628. The output of the multiplexer 775 is then fed to the adder 780 and added to the delta time 765 to produce the new expiration time 785. The new expiration time 785 is stored in the expiration time field 628 in the event table entry 621 associated with the event. If the status in the event status field 629 associated with the event indicates the event is idle (e.g., equals binary '00'), the status is updated to indicate an event is scheduled (e.g., set to binary '01').

In the illustrated embodiment of the invention, the expiration time 628 along with the notification threshold 626 for each event in the event table 610 is represented as a number of clock cycles scaled by a scaling factor 625. Scaling is performed by right shifting the value a specified number of bits, thereby dropping a specified number of least significant bits and retaining the most significant bits. This scaling is performed on the expiration time 628 and notification threshold 626 values primarily as an optimization to decrease the amount of logic and memory required to implement the event table 610. The current time 770 is a value, however, is not a scaled. When performing comparisons with the current time, the current time is adjusted to match the scale of the values in the event table 610 by shifting the current time right the number of bits specified by the scaling factor 625.

FIG. 7B is a table of example scaling factors that can be used with the illustrated embodiment of the present invention. The table is organized into two major columns each of which is for a different system clock rate (e.g., system clock rates for 150 MHz and 200 MHz). Each row is for a different channel rate (e.g., DS0, 128K ISDN, etc.). For each entry within a major column, the scaling factor given under the "Scaling factor shift (bits)" column is the value that would be used for the scaling factor 625 in the above calculation given the system clock rate and the channel rate.

Broadly stated, the scheduling assist continually scans the event table and checks the expiration times and preferably various status information to determine if conditions are met for a notification to be issued. Conditions are met if the expiration time for the event has been reached and preferably the notification queue is not full and the output command queue status and flow bit status indicate the output channel can receive a packet. If conditions are met for a notification to be issued, a notification is issued. This is preferably done by placing a notification in the notification queue. If the notification should not be issued, the event is preferably marked to indicate that a notification is pending.

Figure 8:
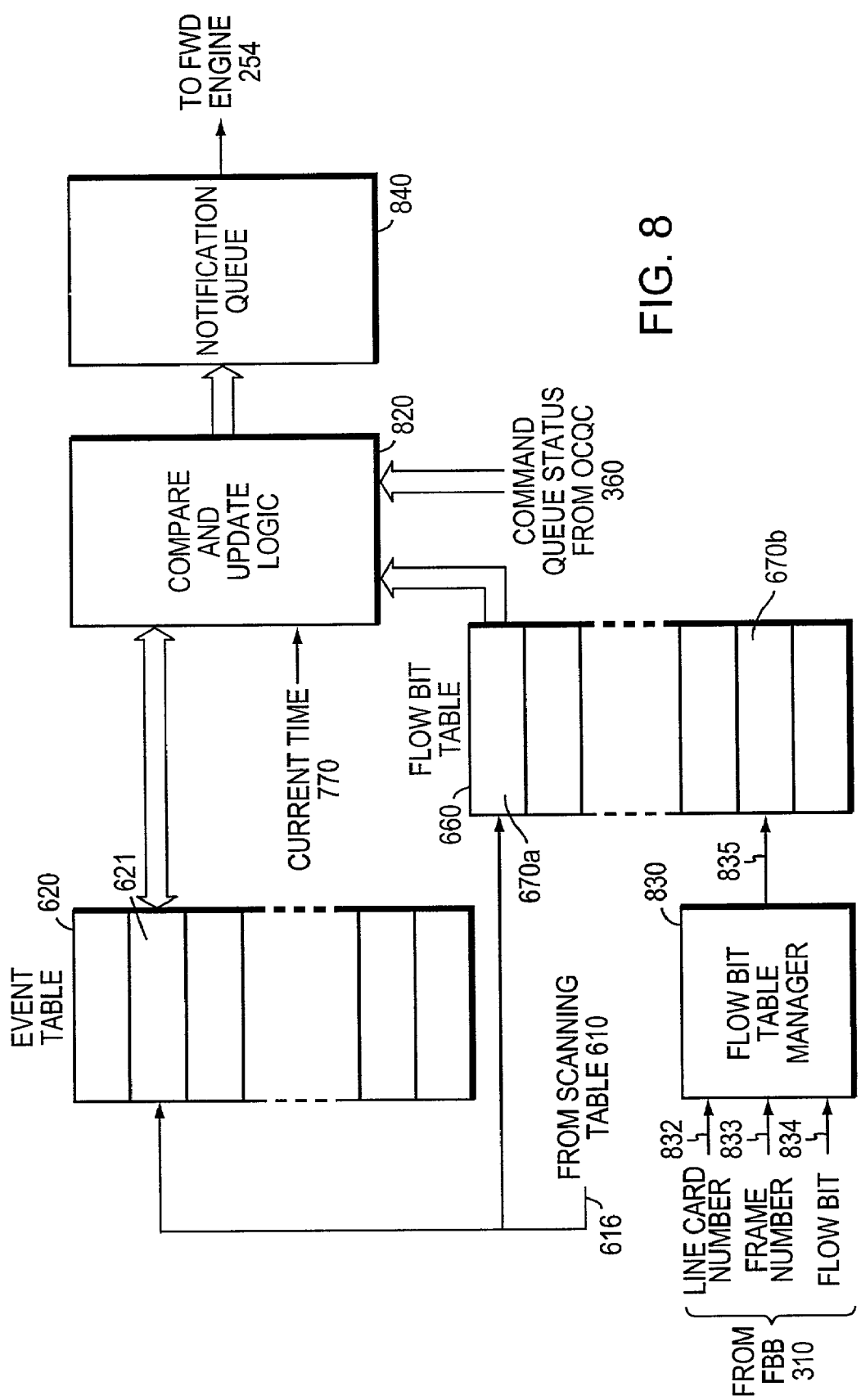
FIG. 8 is a block diagram that illustrates the event checking and notification functions of the illustrated embodiment of the present invention.

FIG. 8 is a block diagram illustrating the event checking and notification functions in accordance with the illustrated embodiment of the present invention. The scanning table 610 provides an index value 616 that is used to select an entry 621 in the event table 620 and its associated entry 670a in the flow bit table. The contents of the selected event table entry 621 and the flow bit table entry 670a are passed to the compare and update logic 820.

The values of the expiration time fields 628 contained in the group of scheduled event entries 631 that comprise the select event table entry 621 are passed to comparator logic (not shown) contained within the compare and update logic 820 block, along with the current time 770 to determine if any of the expiration times associated with the scheduled events have been reached. In the illustrated embodiment of the invention, the comparator logic comprises 8 sets of comparators, each capable of comparing two 30-bit values and determining if the values are equal to one another or one is greater than the other. An expiration time is considered to have been reached if the expiration time is less than OR equal to the current time. If the expiration time for a particular scheduled event has been reached, the scheduling assist performs additional checking to further determine if a notification for that event should be issued. This additional checking includes checking the status of the notification queue, as well as optionally checking the status of the flow bit and the command queue associated with the event.

The flow bit status is checked to determine if the output channel associated with the scheduled event is busy (e.g., the flow bit is asserted). If the output channel is busy, the event notification is deferred. The flow bit status for the scheduled event is read from an entry 670a in the flow bit table 660 that is associated with the event table entry 621. The flow bit table entry 670a is selected using the index value 616 supplied by the scanning table 610. This index value 616 is the same index value that the scanning table 610 supplies to the event table 620.

The flow bit table manager 830 determines the value of the individual flow bits 671 according to information received from packets that are processed by the FBB 310. The information that is provided by the FBB 310 includes a line card number 832, a frame number 833 and a flow bit value 834. The line card number 832 and frame number 833 are used by the flow bit table manager 830 to calculate an index 835 into the flow bit table 860. This index 835 corresponds to the output channel number that is represented by the combination of line card number 832 and frame number 833. This output channel is, in turn, associated with a particular event. The index 835 is used to select a particular flow bit table entry 880 and the flow bit entry 871 within the flow bit table entry 880 corresponding to the combination of line card number 832 and frame number 833. The selected flow bit entry 871 is set to the value specified by the flow bit value 834. The value of the flow bit 834 is the value of the framing bit field for the last complete packet that was received on the channel corresponding to the output channel. The FBB 310 extracts this framing bit information from packets received from the line cards 210.

The flow bit table entry 670a selected by the scanning table output is examined by the compare and update logic 820 to further determine if a notification should be given. The compare and update logic 820 examines the flow bits 671 within the entry 670a that are associated with each scheduled event whose expiration time has passed. If the flow bit value 671 associated with the scheduled event indicates the channel associated with the event is busy, the scheduling assist concludes that a notification should not be issued for that scheduled event and the notification is deferred. In the illustrated embodiment of the invention, this is indicated by setting the event status field 629 to the binary value '10' to indicate that a notification is pending.

The output command queue status is supplied to the compare and update logic 820 from the output command queue controller (OCQC) 360. The status preferably comprises 18 status bits each corresponding to an output command queue. Each status bit indicates whether or not the associated output command queue has exceeded a certain threshold value. If the output command queue associated with a particular line card has exceeded a certain threshold, the status bit associated with the line card is asserted. The compare and update logic 820 selects the particular status bit associated with the selected event table entry 621 using the value of the line card number field 623. If the selected output command queue status bit is asserted, the scheduling assists the notification should not be issued and the notification is deferred.

In the illustrated embodiment of the invention, the scheduling assist can be configured to not check the flow bit status and/or the command queue status, thus, not take these status bits into consideration when determining if a notification should be issued. In this embodiment, flow bit status checking can be suppressed by de-asserting the FC bit 624 in the configuration field 622. Likewise, command queue status checking can be suppressed by setting the line card number field 623 in the configuration field 622 of the selected event table entry is set to a value greater than 17.

The notification queue 840 is preferably checked to determine if the queue has available space such that an entry can be placed in the queue. If the status of the queue indicates that the queue is full (i.e., no space is available for an entry), the scheduling assist concludes that a notification should not be issued and the notification is deferred.

The notification queue is preferably implemented as a FIFO that is logically organized as 512 entries of 15 bits each. Each entry holds an event number. The queue is implemented as a 128×56-bit memory to allow up to 4 events to be written in one cycle. It has one read port and one write port with each port having separate addressing logic that is controlled by a FIFO controller (not shown).

The notifications placed in the notification queue 840 are sent to the forwarding engine 254 via a bus that connects the scheduling assist to the processor 254. In the illustrated embodiment of the invention, this bus is called the RTS (Real Time Status) interface. The RTS interface is a 4-pin interface that communicates 32 bits of Real Time Status.

In an embodiment of the invention, the Cobalt ASIC can be configured to send or suppress scheduling assist notifications to the forwarding engine 254. When configured to send notifications, the Cobalt ASIC sends the event notifications to the forwarding engine 254 over the RTS interface. The scheduling assist drives an event number over the RTS interface to a column of processors within the forwarding engine 254 to notify the forwarding engine 254 when it is time to send from an output queue. At the appropriate time, the scheduling assist returns that event number to the microcode over the RTS interface to essentially "pop" that event number notification. The event number is provided to the column of processors because all processors within the column perform substantially the same work which, in this case, is the dequeue operation.

The event numbers are loaded into an input queue within an RTS interface of the forwarding engine 254. When each processor of the column reaches a point in its instruction code where it needs to perform a dequeue operation, that processor may retrieve the event number at the head of the queue and dequeue the appropriate packet for the output channel requiring service. The scheduling assist 340 continually loads the small input queue with event numbers over the RTS interface. A flow control mechanism is defined to prevent overflow of the input queue by halting issuance of event numbers by the scheduling assist over the RTS interface. The size of the input queue is selected to ensure a constant flow of events over the RTS interface from the scheduling assist 340. The microcode can choose not to read an event notification in which case the RTS interface will "back pressure" the Cobalt ASIC and prevent further notifications from being sent.

For each event that is checked, depending on the result, the compare and update logic 820 updates the event status 629 associated with the event. The status is updated to reflect the results of the expiration time compare in combination with the status checks that are performed. For example, if the expiration time has been reached and a notification has been placed in the notification queue, the status 629 is updated to indicate that no event is scheduled and there is no notification pending. Likewise, if the expiration time has been reached but a notification could not be issued, the status 629 is updated to indicate an event is not scheduled and there is a notification pending. When the event is subsequently checked and a notification can be issued, a notification is placed on the notification queue and the event status is updated to indicate that no event is scheduled and there is no notification pending.

In an embodiment of the invention, a notification threshold feature is provided to allow a notification to be issued to the forwarding engine prior to the expiration time associated an the event. The notification threshold is specified in the notification threshold field 626. Using this feature, when the expiration time minus the notification threshold is less than OR equal to the current time, conditions are met to issue a notification. Additionally, in other embodiments of the invention, certain other conditions need to be met before the scheduling assist concludes that a notification should be issued. These other conditions include ensuring a notification can be placed on the notification queue and ensuring the status of the command queue and output flow bits of an output channel associated with the event indicate a notification should be issued.

The notification threshold feature is useful when the scheduling assist is used to manage output queues. For example, using this feature a processor can be notified and issue another output command to dequeue a packet to an output channel before the output channel goes completely empty, thus keeping the output channel busy and avoiding the introduction of gaps between packets.

Figure 9:
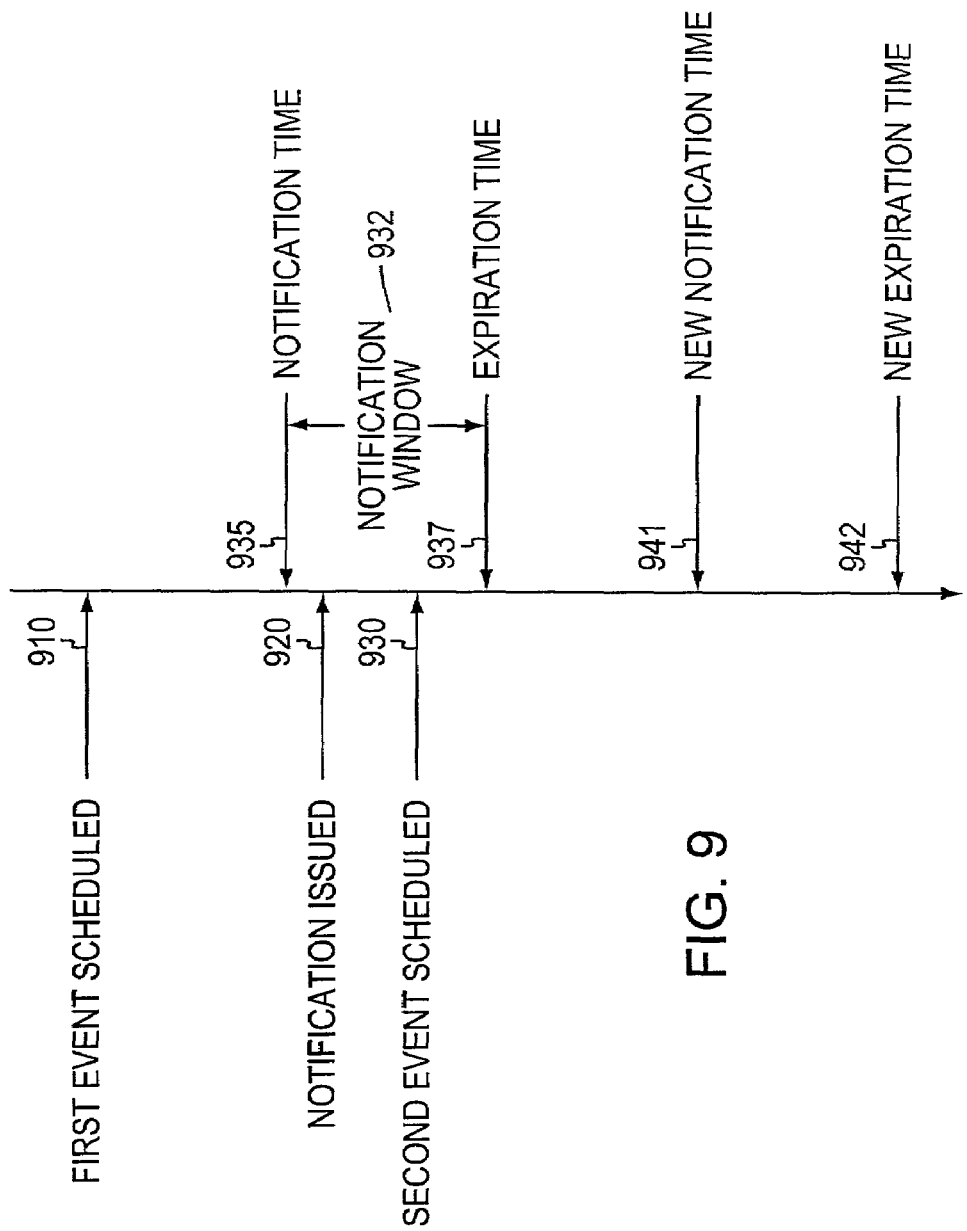
FIG. 9 is a timeline that illustrates the operation of the notification threshold feature of an embodiment of the present invention.

FIG. 9 is an illustration of a timeline that shows how the notification threshold feature can be used to assist in the management of an output channel. Referring to FIG. 9, a first event 910 is scheduled when a packet is dequeued to the output channel. The expiration time 937 for the first event is calculated by the scheduling assist. The notification time 935 is equal to the expiration time 937 minus the threshold time that is associated with the event. The notification time 935 is the earliest time a notification could be issued for the first event (i.e., the time represented by the expiration time minus the notification threshold). When the adjusted current time falls between the notification time 935 and the expiration time 937, the scheduled event is within the notification window 932 and a notification can be issued at any time within this window. If at some time during the notification window 932 all the conditions for notification are met, a notification is issued. When a notification is issued, the processor knows that it can safely dequeue another packet to the output channel.

During the period between the notification time 935 and the actual event expiration time 937, the scheduled event remains running (e.g., the expiration time continues to be checked to determine if the expiration time has been reached). If the forwarding engine prior to the expiration time 937 schedules a subsequent event 930 (i.e., dequeues another packet), a new expiration time 942 is calculated by adding the time specified in the request to the current expiration time, rather than using the current time. This preserves the time remaining from the previously scheduled event. The notification time 941 associated with the subsequent scheduled event 930 is equal to the new expiration time 942 minus the notification threshold.

The notification threshold for a particular event is preferably specified in the notification threshold field 626 associated with the event. The value is specified as a time value that is scaled using the scaling factor 625. The value is used by the compare and update logic 820 to calculate the earliest notification time for the event. The earliest notification time is calculated by subtracting the threshold value from the expiration time. This earliest notification time corresponds to the notification time 935 as discussed above. A threshold value of zero indicates that no early notification is to be given.

It should be noted that the illustrated embodiment of the present invention described above is described in a manner that would enable one skilled in the art to implement the present invention in hardware. However, this is not a limitation of the invention. The described technique employed by the present invention can be implemented in whole or in part using computer readable and executable program instructions using well-known techniques known to persons skilled in the art of software development.

For example, the technique performed by the scheduling assist could be performed as a detached software process (task), portions of which are typically resident in a computer memory and executed on a processor. It will be apparent to those skilled in the art that other memory means, including various computer readable media, may be used for storing and executing program instructions pertaining to the described mechanism and technique. The task could be configured to communicate with the forwarding processor's microcode to schedule events and send notifications using well-known methods for inter-task communication. For example, requests to schedule events and event notifications could be issued in the form of a message.

It should be further noted that the illustrated embodiment of the invention described above describes the invention as it could be used in an intermediate node, such as a router. However, this is not a limitation of the invention. Rather, the invention could be implemented in a system that comprises a processor and a scheduling assist function implemented in either hardware or software.

A scheduling assist function has been described. The described scheduling assist function enables a processor to schedule an event, specifying an expiration time, and be notified when the event has expired. In addition, the described scheduling assist function provides additional features that enable a processor to use the scheduling assist function to locate output queues that are in condition to receive a packet that is to be dequeued by the processor. It will however be apparent that other variations and modifications may be made to the described embodiments herein, with the attainment of some or all of their advantages. Therefore, it is the object of the appended claims to cover all such variations and modifications that come within the true spirit and scope of the invention.

What is claimed is:

1. A method for performing a scheduling assist function, the method comprising the steps of:
   receiving a request to schedule an event;
   calculating an expiration time associated with the event using information contained in the request, the information including a byte length and an inverted rate, the information describing an output channel;
   determining if conditions are met to issue a notification, the conditions at least including that the expiration time has been reached; and
   issuing a notification if conditions are met.

2. The method of claim 1 wherein the step of calculating an expiration time using information contained in the request further comprises the steps of:
   multiplying the byte length by the inverted rate; and
   adding a current time if the event is idle otherwise adding an old expiration time.

3. The method of claim 1 wherein the step of determining if conditions are met to issue a notification further comprises the steps of:
   (a) comparing a current time to an expiration time; and
   (b) concluding the conditions are met to issue a notification if the expiration time is less than OR equal to the current time.

4. The method of claim 3 further comprising before step (a) the steps of:
   selecting an event table entry from a plurality of event table entries in an event table; and
   selecting the expiration time from a plurality of expiration times contained in the selected event table entry.

5. The method of claim 4 wherein the step of selecting an event table from a plurality of event table entries in an event table further comprises the step of:
   selecting the event table entry using a scanning table.

6. The method of claim 3 further comprising after step (a) the steps of:
   determining if an output command queue associated with the event is above a threshold; and
   performing step (b) if the output command queue is above the threshold.

7. The method of claim 3 further comprising after step (a) the steps of:
   determining if a flow bit associated with the event indicates busy; and
   performing step (b) if the flow bit does not indicate busy.

8. The method of claim 3 further comprising after step (a) the steps of:
   determining if a notification queue can receive a notification; and
   performing step (b) if the notification queue can receive a notification.

9. The method of claim 1 further comprising the step of:
   updating status information associated with the event.

10. The method of claim 1 wherein the step of determining if conditions are met to issue a notification further comprises the steps of:
    (a) comparing a current time to an expiration time minus a notification threshold; and
    (b) concluding the conditions are met to issue a notification if the expiration time minus the notification threshold is less than OR equal to the current time.

11. A computer readable medium containing executable instructions for performing a scheduling assist function, the executable program instructions for:
    receiving a request to schedule an event;
    calculating an expiration time associated with the event using information contained in the request, the information including a byte length and an inverted rate, the information describing an output channel;
    determining if conditions are met to issue a notification, the conditions at least including that the expiration time has been reached; and
    issuing a notification if conditions are met.

12. The computer readable medium of claim 11 further comprising computer executable instructions for performing:

multiplying the byte length by the inverted rate; and
adding a current time if an event is idle otherwise adding an old expiration time.

13. The computer readable medium of claim 11 further comprising computer executable instructions for performing:
   (a) comparing a current time to the expiration time; and
   (b) concluding conditions are met to issue a notification if the expiration time is less than OR equal to the current time.

14. The computer readable medium of claim 13 further comprising computer executable instructions before step (a) for performing:
   selecting an event table entry from a plurality of event table entries in an event table; and
   selecting the expiration time from a plurality of expiration times contained in the selected event table entry.

15. The computer readable medium of claim 14 wherein the step of selecting an event table from a plurality of event table entries in an event table further comprising computer executable instructions for performing:
   selecting the event table entry using a scanning table.

16. The computer readable medium of claim 13 further comprising computer executable instructions for performing after step (a):
   determining if an output command queue associated with the event is above a threshold; and
   performing step (b) if the output command queue is above the threshold.

17. The computer readable medium of claim 13 further comprising computer executable instructions for performing after step (a):
   determining if a flow bit associated with the event indicates busy; and
   performing step (b) if the flow bit does not indicate busy.

18. The computer readable medium of claim 13 further comprising computer executable instructions for performing after step (a):
   determining if a notification queue can receive a notification; and
   performing step (b) if the notification queue can receive a notification.

19. An apparatus configured to perform a scheduling assist function the apparatus comprising:
   means for receiving a request to schedule an event;
   means for calculating an expiration time associated with the event using information contained in the request, the information including a byte length and an inverted rate;
   means for determining if conditions are met to issue a notification; and
   means for issuing a notification if conditions are met to issue a notification.

20. The apparatus of claim 19 wherein the means for calculating an expiration time using information contained in the request further comprises:
   means for multiplying the byte length by the inverted rate; and
   means for adding an old expiration time if an event is idle otherwise adding a current time.

21. The apparatus of claim 19 wherein the means for determining if conditions are met to issue a notification further comprises:
   means for comparing a current time to the expiration time; and
   means for concluding conditions are met to issue a notification if the expiration time is less than OR equal to the current time.

22. The apparatus of claim 21 further comprising:
   means for selecting an event table entry from a plurality of event table entries in an event table; and
   means for selecting the expiration time from a plurality of expiration times contained in the selected event table entry.

23. The apparatus of claim 22 wherein the means for selecting an event table from a plurality of event table entries in an event table further comprises:
   means for selecting the event table entry using a scanning table.

24. The apparatus of claim 21 further comprising:
   means for determining if an output command queue associated with the event is above a threshold; and
   means for concluding conditions are met to issue a notification if the expiration time is less than OR equal to the current time and the output command queue is above the threshold.

25. The apparatus of claim 21 further comprising:
   means for determining if a flow bit associated with the event indicates busy; and
   means for concluding conditions are met to issue a notification if the expiration time is less than OR equal to the current time and the flow bit does not indicate busy.

26. The apparatus of claim 21 further comprising:
   means for determining if a notification queue can receive a notification; and
   means for concluding conditions are met to issue a notification if the expiration time is less than OR equal to the current time and the notification queue can receive a notification.

27. A method for determining when a packet can be dequeued to an output channel, the method comprising the steps of:
   scheduling an event associated with the output channel by issuing a request to a scheduling assist function, the request including a byte length associated with the packet and a rate associated with the output channel; and
   receiving a notification when the output channel becomes available.

28. A method of scheduling an event comprising the steps of:
   receiving, from a processor, a request to schedule an event, the request containing information describing the characteristics of an output channel associated with the event, the information including a byte length and a rate associated with the output channel;
   calculating an expiration time associated with the event from the information describing characteristics of the output channel;
   determining if the output channel associated with the event is available;
   comparing the expiration time with a current time and determining if the expiration time has been reached; and
   in response to determining that the output channel is available and that the expiration time has been reached, issuing a notification to the processor, the notification indicating the event is to be serviced.

29. The method of claim 28 wherein the step of comparing further comprises the step of:

Selecting an entry in an event table for comparison, each entry containing a plurality of event expiration times associated with events, and comparing the plurality of event expiration times to the current time.

30. The method of claim 28 wherein the step of comparing further comprises the step of:
subtracting a notification threshold from the expiration time prior to comparing.

31. The method of claim 28 wherein the step of determining further comprises the steps of:
determining if a flow bit associated with the event indicates busy; and
performing the step of issuing a notification only if the flow bit does not indicate busy.

32. A method of scheduling an event comprising the steps of:
receiving, from a processor, a request to schedule an event, the request containing information describing the characteristics of an output channel associated with the event;
calculating an expiration time associated with the event from the information describing characteristics of the output channel;
determining if the output channel associated with the event is available;
comparing the expiration time with a current time and determining if the expiration time has been reached;
determinining if a notification queue can receive a notification;
in response to determining that the output channel is available and that the expiration time has been reached, issuing the notification only if the notification queue can receive the notification, the notification indicating the event is to be serviced.

33. A method for a processor to offload even scheduling, comprising the steps of:
issuing a request to schedule an event to a separate scheduling assist function, the request containing information describing an output channel associated with the event, the information including a byte length and a rate associated with the output channel to calculate an expiration time for the event at the output channel; and
when the expiration time is less than OR equal to a current time, receiving a notification from the scheduling assist, the notification indicating the event is to be serviced.

34. An apparatus for scheduling an event comprising:
means for receiving, from a processor, a request to schedule an event, the request containing information describing an output channel associated with the event, the information including a byte length and a rate associated with the output channel;
means for calculating an expiration time associated with the event from the information describing the output channel;
means for determining if the output channel associated with the event is available;
means for comparing the expiration time with a current time and determining if the expiration time has been reached; and
means for issuing a notification to the processor, the notification indicating the event is to be serviced, in response to determining that the output channel is available and that the expiration time has been reached.

35. The apparatus of claim 34 further comprising:
means for selecting an entry in an event table for comparison, each entry containing a plurality of event expiration times associated with events, and comparing the plurality of event expiration times to the current time.

36. The apparatus of claim 34 further comprising:
means for subtracting a notification threshold from the expiration time prior to comparing.

37. The apparatus of claim 34 further comprising:
means for determining if a flow bit associated with the event indicates busy; and
means for performing the steps of issuing a notification only if the flow bit does not indicate busy.

38. The apparatus of claim 34 further comprising:
means for determining if a notification queue can receive the notification; and
means for performing the steps of issuing a notification only if the notification queue can receive a notification.

39. A computer readable medium containing executable program instructions for scheduling an event, the executable program instructions comprising program instructions for:
receiving, from a processor, a request to schedule an event, the request containing information describing the characteristics of an output channel associated with the event, the information including a byte length and a rate associated with the output channel;
calculating an expiration time associated with the event from the information describing characteristics of the output channel;
determining if the output channel associated with the event is available;
comparing the expiration time with a current time and determining if the expiration time has been reached; and
in response to determining that the output channel is available and that the expiration time has been reached, issuing a notification to the processor, the notification indicating the event is to be serviced.

40. A computer readable medium containing executable program instructions for enabling a processor to offload event scheduling, the executable program instructions comprising program instructions for:
issuing a request to schedule an event to a separate scheduling assist function, the request containing information describing an output channel associated with the event, the information including a byte length and a rate associated with the output channel to calculate an expiration time for the event at the output channel; and
when the expiration time is less than OR equal to a current time, receiving a notification from the scheduling assist, the notification indicating the event is to be serviced.

* * * * *